United States Patent [19]
Okubo et al.

[11] Patent Number: 5,973,636
[45] Date of Patent: Oct. 26, 1999

[54] RADAR APPARATUS WITH A SIMPLIFIED CONSTRUCTION

[75] Inventors: Naofumi Okubo; Teruhisa Ninomiya; Tamio Saito, all of Kawasaki; Osamu Isaji, Hyogo, all of Japan

[73] Assignees: Fujitsu Ltd., Kawasaki; Fujitsu Ten Ltd., Hyogo, both of Japan

[21] Appl. No.: 08/783,058

[22] Filed: Jan. 14, 1997

[30] Foreign Application Priority Data

Mar. 12, 1996 [JP] Japan .................................. 8-055123

[51] Int. Cl.⁶ .............................. G01S 13/93; G01S 13/42
[52] U.S. Cl. .............................. 342/70; 342/82; 342/88; 342/109
[58] Field of Search .................................. 342/70, 71, 72, 342/98, 100, 111, 116, 82, 83, 84, 85, 88, 109

[56] References Cited

U.S. PATENT DOCUMENTS

| | | | |
|---|---|---|---|
| 3,680,085 | 7/1972 | Del Signore | 342/128 |
| 4,739,330 | 4/1988 | Lazarus | 342/122 |
| 5,229,774 | 7/1993 | Komatsu | 342/70 |
| 5,325,096 | 6/1994 | Pakett | 342/70 |
| 5,381,153 | 1/1995 | Saito, et al. | 342/70 |
| 5,402,129 | 3/1995 | Gellner et al. | 342/70 |
| 5,617,098 | 4/1997 | Koyanagi et al. | 342/70 |

FOREIGN PATENT DOCUMENTS

| | | |
|---|---|---|
| 0202984 | 11/1986 | European Pat. Off. . |
| 58-050482 | 3/1983 | Japan . |
| 2165414 | 4/1986 | United Kingdom . |

OTHER PUBLICATIONS

Saito et al., "An FM–CW Radar Module With Front–End Switching Heterodyne Receiver", International Microwave Symposium Digest (MTT–S), Albuquerque, Jun. 1–5, 1992, Vol. 2, Jun. 1 1992, pp. 713–716, XP000343419.

M. I. Skolnik, *Introduction to Radar Systems*, 1980, McGraw Hill, Singapore, Section 3.3, "Frequency–Modulated CW Radar", Subsection "Range and Doppler Measurement", pp. 80–92, XP002083437.

McGregor et al., "Switching system for single antenna operation of an S–band FMCW radar", IEE Proceedings Radar, Sonar and Navigation, vol. 141, No. 4, Aug., 1994, pp. 241–248, XP000458143.

European Search Report (Application No. 97100604.4) dated Apr. 12, 1999.

*Primary Examiner*—John B. Sotomayor
*Attorney, Agent, or Firm*—Staas & Halsey

[57] ABSTRACT

A single antenna is used so that time-division transmission and reception is carried out in a radar apparatus for obtaining a distance and a relative speed with respect to a target object based on a beat signal obtained by transmitting a frequency modulated signal and mixing a received signal reflected by said target object with the frequency modulated signal that is transmitted.

16 Claims, 25 Drawing Sheets

TRANSMISSION On
TRANSMISSION Off $\tau$

REFLECTED SIGNAL

RECEPTION STATUS On
Off

FIG. 15

| τ | f sw | Rmax | RECEIVED POWER AT DIFFERENT LOCATIONS | | | |
|---|---|---|---|---|---|---|
| | | | 1/3Rmax | 1/2Rmax | 2/3Rmax | Rmax |
| 1.0 μS | 500kHz | 150.0m | −9.5dB | −6.0dB | −3.5dB | −0.0dB |
| 0.5 μS | 1MHz | 75.0m | −9.5dB | −6.0dB | −3.5dB | −0.0dB |
| 0.05 μS | 10MHz | 7.5m | −9.5dB | −6.0dB | −3.5dB | −0.0dB |

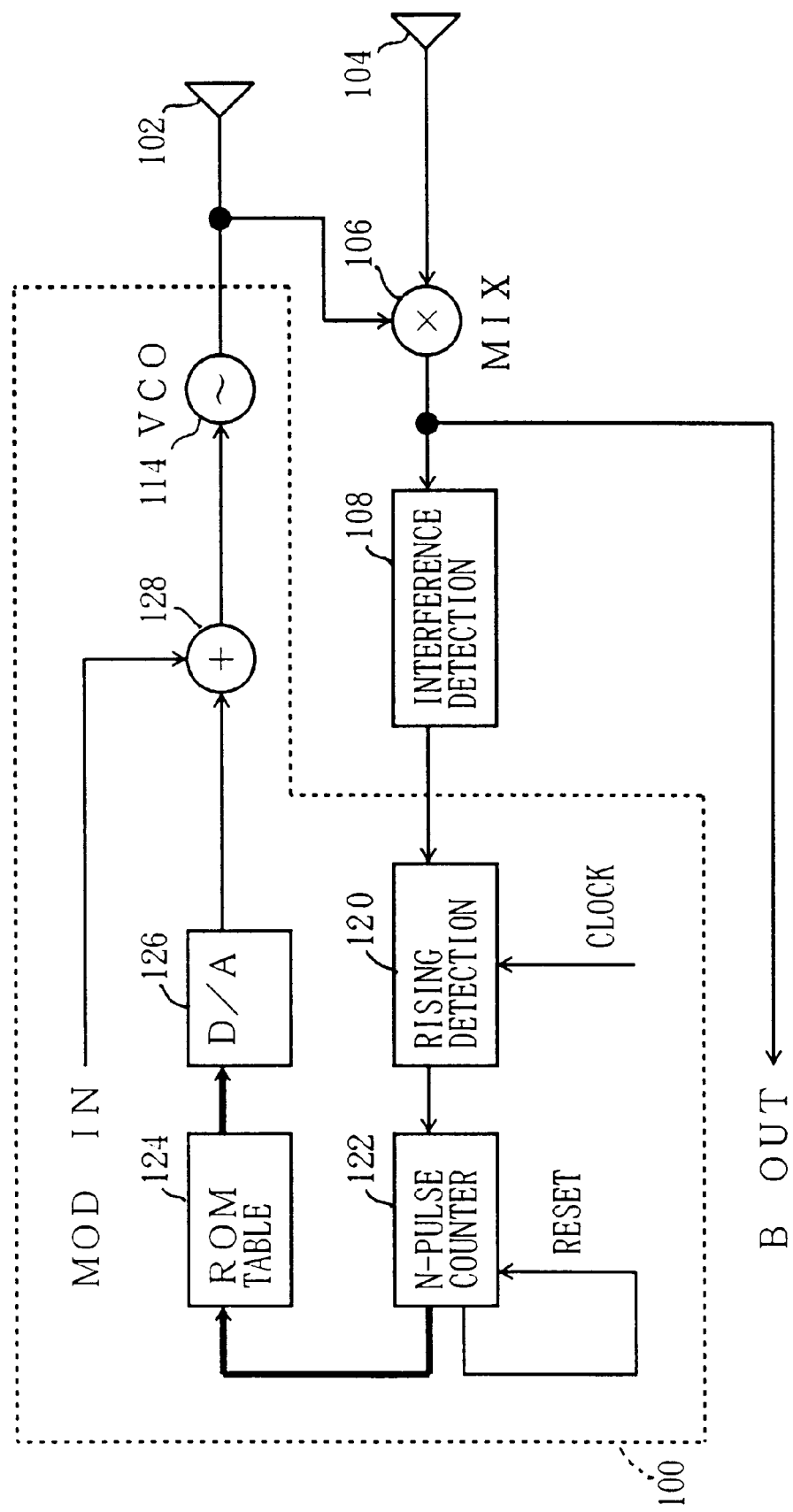

RADAR APPARATUS WITH A SIMPLIFIED CONSTRUCTION

BACKGROUND OF THE INVENTION

1. Field of the Invention

The present invention relates to radar apparatuses and, more particularly, to a radar apparatus for use in automobiles.

Under recent circumstances, in which automobile accidents are increasing yearly with the increase in use of automobiles, it has become necessary for an automobile to be equipped with an apparatus supporting safety of operation. Such an apparatus should be capable of warning a driver of a possible crash, measuring a ground speed accurately and controlling the engine properly while the automobile is driven on a wet road.

2. Description of the Related Art

Conventional radars for measuring a relative speed and distance of an automobile with respect to a target object include a frequency modulated continuous wave (FMCW) radar and a pulse Doppler radar. In an FMCW radar, as shown in FIG. 1, a triangular baseband signal is supplied to a transmission voltage controlled oscillator (VCO) 10 for frequency modulation. A resultant high-frequency signal obtained from the voltage controlled oscillator 10 is transmitted via a transmission antenna 11. A portion of the high-frequency signal is branched off to a reception mixer (MIX) 12 supplied with a received signal received via a reception antenna 13. According to this arrangement, a beat signal commensurate with a distance from a target object and a relative speed with respect to the target object is obtained. Since such a construction enables a significantly simple signal processing unit to provide a relative speed signal and a distance signal, it is extensively being applied to radar apparatuses such as an automobile radar apparatus which are expected to be small and inexpensive.

In one specific implementation of a radar apparatus illustrated in FIG. 2, a switch (SW) 16 is provided between the reception antenna 13 and the reception mixer 12 so as to prevent a signal-to-noise ratio from being degraded due to a leak of the triangular modulating signal to the reception side and to attenuate 1/f noise provided by the reception mixer (MIX) 12. The switch 16 may be operated according to a drive signal (LO) from an oscillation source 18 so as to subject the received signal to frequency conversion. The received signal output from the reception mixer (MIX) 12 is supplied to a second mixer 22 via a band-pass filter (BPF) 20. In the second mixer 22, the received signal is subject to frequency conversion again, using the drive signal (LO), so that a beat signal is obtained.

For example, a frequency $f_0$ of a transmitted signal output by the voltage controlled oscillator 10 is on the order of 10–100 GHz, a frequency $f_{SW}$ of the switch drive signal (LO) is on the order of 10–100 MHz and a beat frequency $f\delta$ produced by the transmitted signal and the received signal is below the order of 10–100 KHz. The frequency of the triangular wave is on the order of 100–1000 Hz. The amplitude of the transmitted signal supplied to the reception mixer 12 varies due to the frequency response of the VCO 10 and the line. The frequency of the amplitude variation is 100–1000 Hz. Since the reception mixer 12 has an AM demodulating function as well as the frequency conversion function, the output signal of the reception signal 12 inevitably includes noise in the form of the amplitude variation.

The frequency of the received signal received via the reception antenna 13 is given by $f_0+f\delta$. As a result of the frequency conversion using the switch 16, a received signal having frequencies between $f_0+f\delta-f_{SW}$ and $f_0+f\delta+f_{SW}$ is produced. Accordingly, the reception mixer 12 produces an IF signal having frequencies between $f_{SW}-f\delta$ and $f_{SW}+f\delta$. The IF signal contains a noise in the form of amplitude variation having a frequency on the order of 100–1000 Hz. Since the IF signal has a frequency on the order of 10–100 MHz, the noise in the form of the amplitude variation is removed by the band-pass filter 20. The mixer 22 subjects the IF signal having the noise removed to frequency conversion so as to obtain the beat signal having a frequency $f\delta$.

The antennas 11 and 13 must have a size commensurate with a beamwidth capable of covering a single traffic lane so as not to detect a reflected wave from a non-target object outside a detection range of the radar. For example, given that the detection range is 100 m, and the width of a lane is 3.6 m, the beamwidth required to keep out a reflected wave from a vehicle driven in another lane 100 m ahead would be 2.1 degrees. As is well known, the relationship between the beamwidth B and the diameter D of the reflector antenna is given by $$D \approx 70 \times \lambda/B$$

Assuming that the beamwidth is 2.1 degrees and the frequency is 60 GHz (the wavelength=5 mm), the diameter D of the antenna is 167 mm, according to the above equation.

In the 100 m distance, an area covered by the radar is determined by a product of gain drops of the transmission and the reception antenna at a given angular separation. Thus, the diameter may actually be smaller than the result obtained according to the above equation. Antennas having a diameter of about 110 mm are usually used.

Desirably, an automobile radar apparatus is designed so as not to detract from the aesthetic design of the automobile body. For optimum matching with the design, the smaller the radar apparatus, the better. Also, an automobile radar apparatus is ideally inexpensive in order to be available to the general public. However, requirement for concurrent transmission and reception imposes the use of both the transmission antenna and the reception antenna, so that it is difficult to achieve reduction of the size and price of an automobile radar apparatus according to the conventional technology.

As shown in FIG. 3, one approach to reduce the size of the radar apparatus is to use a directional coupler 26 so that a transmission and reception antenna 24 can be shared. In the circuit of FIG. 3, a portion of the transmission power is supplied to the transmission and reception antenna 24 via the directional coupler 26. An isolation capability of the directional coupler 26 is utilized to supply a local power to the reception mixer 12. The degree of coupling of the directional coupler 26 is set below 10 dB so as not to draw an excessively large power to the reception mixer 12 in consideration of the withstand capability of the reception mixer 12. Accordingly, a problem with this approach is that the voltage controlled oscillator 10 is required to output a significantly larger power than the actual output power needed to attain a satisfactorily long detection range. For example, assuming that the power actually radiated by the antenna is 10 mW, a power exceeding 100 mW is needed. Although an output on the order of 10–100 mW can be easily obtained by high-output devices such as an IMPATT diode and a Gunn diode in the milliwave band, an output exceeding 100 mW cannot be obtained easily by the present device technology. It is also to be noted that devices such as the IMPATT diode and the Gunn diode are quite expensive.

Since the isolation capability of the directional coupler 26 is used in the approach of FIG. 3, the local input power varies due to the antenna impedance. For this reason, it is difficult for the reception mixer 12 to perform stable frequency conversion.

One problem that arises as the number of vehicles equipped with an automobile radar apparatus increases is radio interference from other vehicles. Since automobile radars share generally the same frequency band, radars carried on automobiles driven in the opposite lane may cause radio interference so that the target object ahead of the user driving in the same lane, becomes lost on the radar.

Conventional approaches to prevent radio interference include the use of a 45-degree linearly polarized wave antenna or a circularly polarized wave antenna. Polarization discrimination provided by such types of antennas is used to attenuate radio interference from other vehicles. However, polarization discrimination provided by such types of antennas is 20–25 dB at best. As the number of vehicles equipped with radar increases, the interfering signal level increases so that the conventional technology cannot provide satisfactory performance from the radar.

SUMMARY OF THE INVENTION

Accordingly, an object of the present invention is to provide radar apparatuses in which the aforementioned problems are eliminated.

Another and more specific object of the present invention is to provide a radar apparatus of a reduced size and cost in which transmission and reception can be performed by a single antenna.

Still another object of the present invention is to provide a radar apparatus in which interference from other apparatuses can be detected and removed.

In order to achieve the aforementioned objects, the present invention provides a radar apparatus for obtaining a distance and a relative speed with respect to a target object based on a beat signal obtained by transmitting a frequency modulated signal and mixing a received signal reflected by said target object with the frequency modulated signal that is transmitted, wherein a single antenna is used so that time-division transmission and reception is carried out. According to the radar apparatus of the present invention, transmission and reception can be performed by a single antenna and the size and cost are reduced.

In one preferred embodiment of the present invention, transmission and reception switching is conducted at a frequency in excess of double a modulating frequency of said frequency modulated signal that is transmitted. According to this aspect of the present invention, it is possible to calculate a distance and a relative speed with respect to a target object even in time-division transmission and reception.

The present invention also provides a radar apparatus for obtaining a distance and a relative speed with respect to a target object based on a beat signal obtained by transmitting a frequency modulated signal, subjecting a received signal to switching at a predetermined frequency, mixing the received signal with the frequency modulated signal that is transmitted and further mixing a mixed signal with a switching signal having said predetermined frequency, wherein a single antenna is used so that time-division transmission and reception is carried out. According to this aspect of the present invention, it is possible to remove a noise caused by amplitude variation in a transmitted signal from a beat signal so that a distance and a relative speed with respect to a target object can be detected with a high precision.

Preferably the radar apparatus comprises: antenna sharing means connected to said single antenna; a transmission switch for supplying said frequency modulated signal to said antenna sharing means; and a reception switch for supplying a received signal received via said antenna sharing means to a circuit for mixing said received signal with said frequency modulated signal that is transmitted, wherein switching between said transmission switch and said reception switch is effected by signal inversion. According to this aspect of the present invention, it is possible to perform time-division transmission and reception properly.

The antenna sharing means may be implemented by a circulator, a 900 hybrid circuit or a branch circuit. According to this aspect of the present invention, attenuation in a transmitted signal and a received signal in the antenna sharing means can be reduced.

In another preferred embodiment of the present invention, the radar apparatus further comprises a single-port double-throw switch for connecting said single antenna to one of a circuit for outputting a frequency modulated signal and a circuit for mixing a received signal received via said antenna with said frequency modulated signal that is transmitted. According to this aspect of the present invention, it is possible to perform time-division transmission and reception using a reduced number of parts.

In yet another preferred embodiment of the present invention, the radar apparatus comprises: antenna sharing means connected to said single antenna; a transmission switch for supplying said frequency modulated signal to said antenna sharing means; and a reception switch for supplying a received signal received via said antenna sharing means to a circuit for mixing said received signal with said frequency modulated signal that is transmitted, wherein said reception switch is subjected to switching at said predetermined frequency when said transmission switch is open. According to this aspect of the present invention, the reception switch is capable of performing a switching between transmission and reception and a switching between predetermined frequencies of received signals.

The present invention also provides a radar apparatus for obtaining a distance and a relative speed with respect to a target object based on a beat signal obtained by transmitting a frequency modulated signal and mixing a received signal reflected by said target object with the frequency modulated signal that is transmitted, said radar apparatus comprising interference detecting means for detecting an interfering signal mixed in said beat signal and provided by another radar apparatus. According to this aspect of the present invention, it is possible to detect that a transmitted signal from another apparatus is mixed with and interferes a reflected signal intended to be received.

In a preferable embodiment, the radar apparatus may comprise frequency varying means for varying a center frequency of said frequency modulated signal in the event that said interfering signal is detected. According to this aspect of the present invention, it is possible to obtain a beat signal with reduced interference by varying the frequency of a transmitted signal in the event of an interference.

BRIEF DESCRIPTION OF THE DRAWINGS

Other objects and further features of the present invention will be apparent from the following detailed description when read in conjunction with the accompanying drawings, in which:

FIG. 15 is a table showing the operation of the radar apparatus according to the sixth embodiment;

FIG. 23 is a block diagram of frequency hopping means;

DESCRIPTION OF THE PREFERRED EMBODIMENTS

Figure 1:
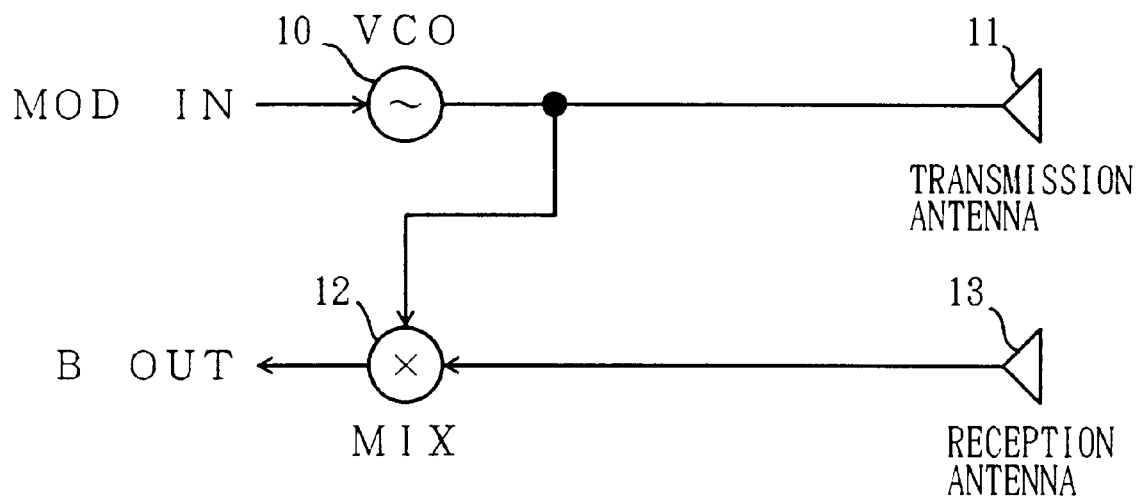
FIG. 1 shows a construction of a conventional FMCW radar.
Figure 2:
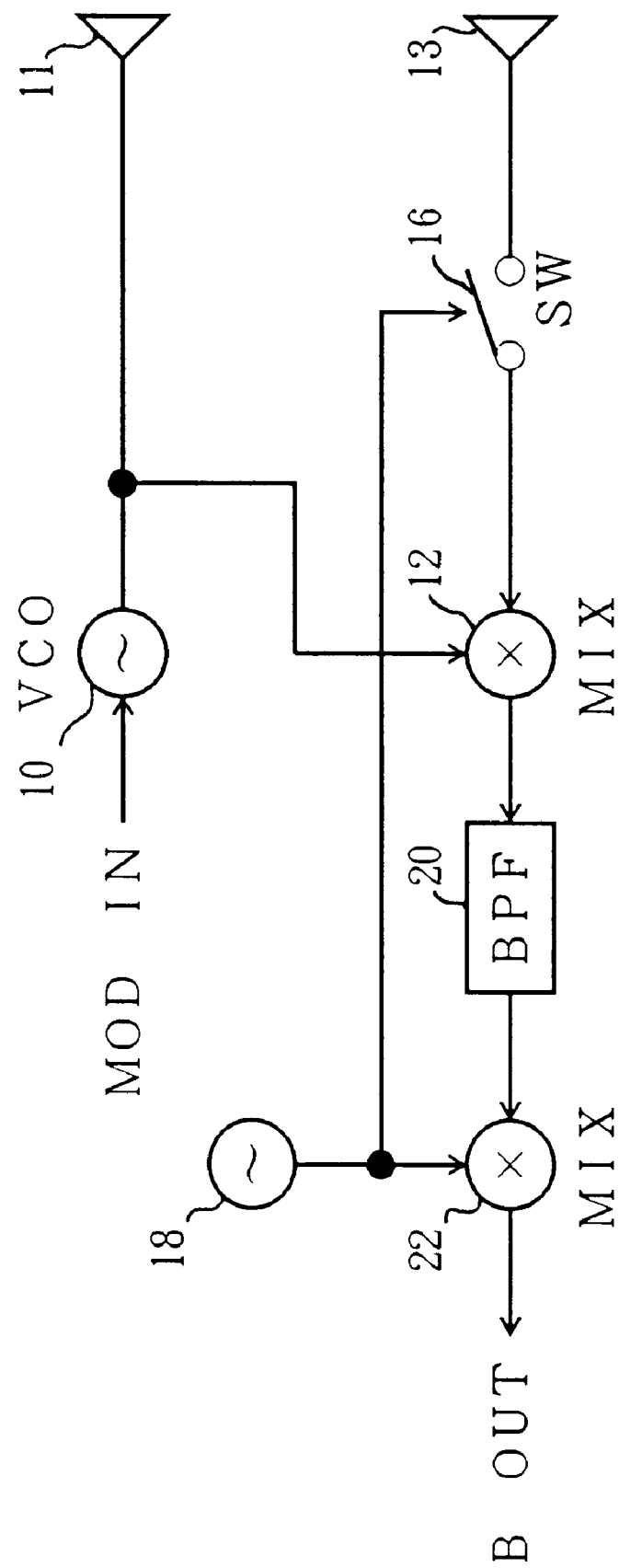
FIG. 2 shows another construction of a conventional FMCW radar.
Figure 3:
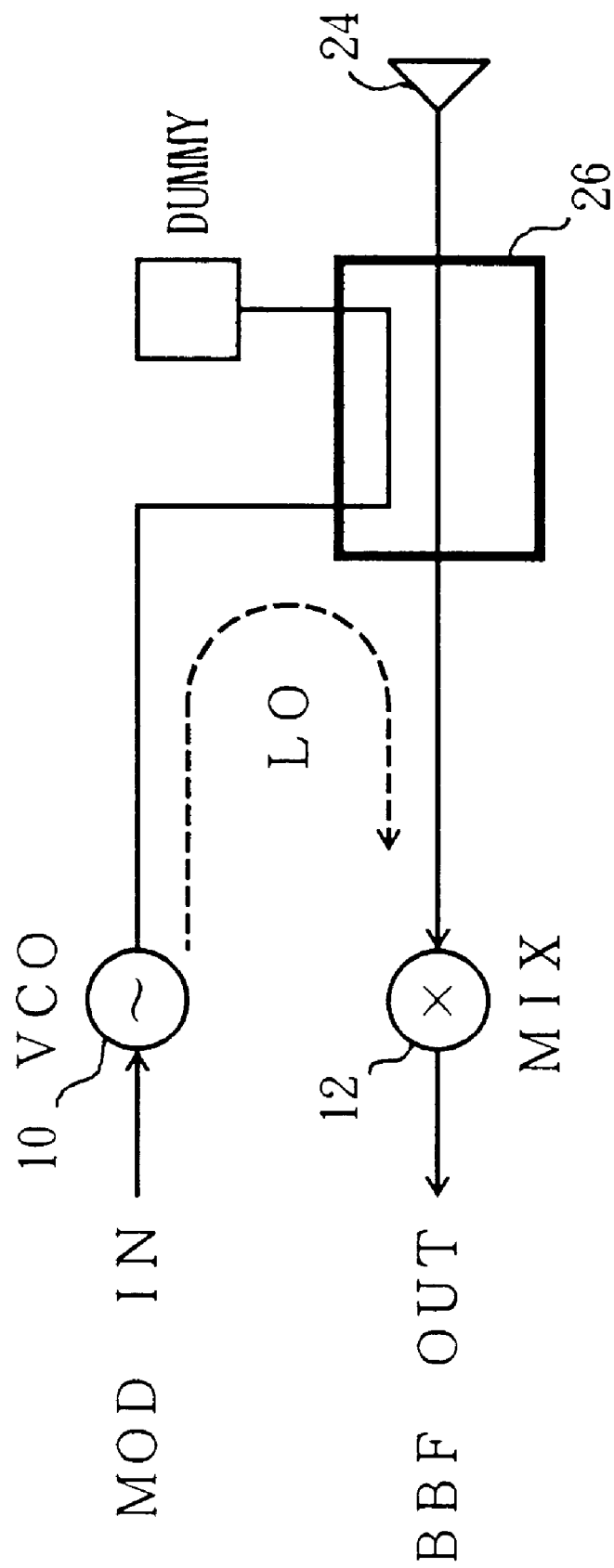
FIG. 3 shows still another construction of a conventional FMCW radar.
Figure 4:
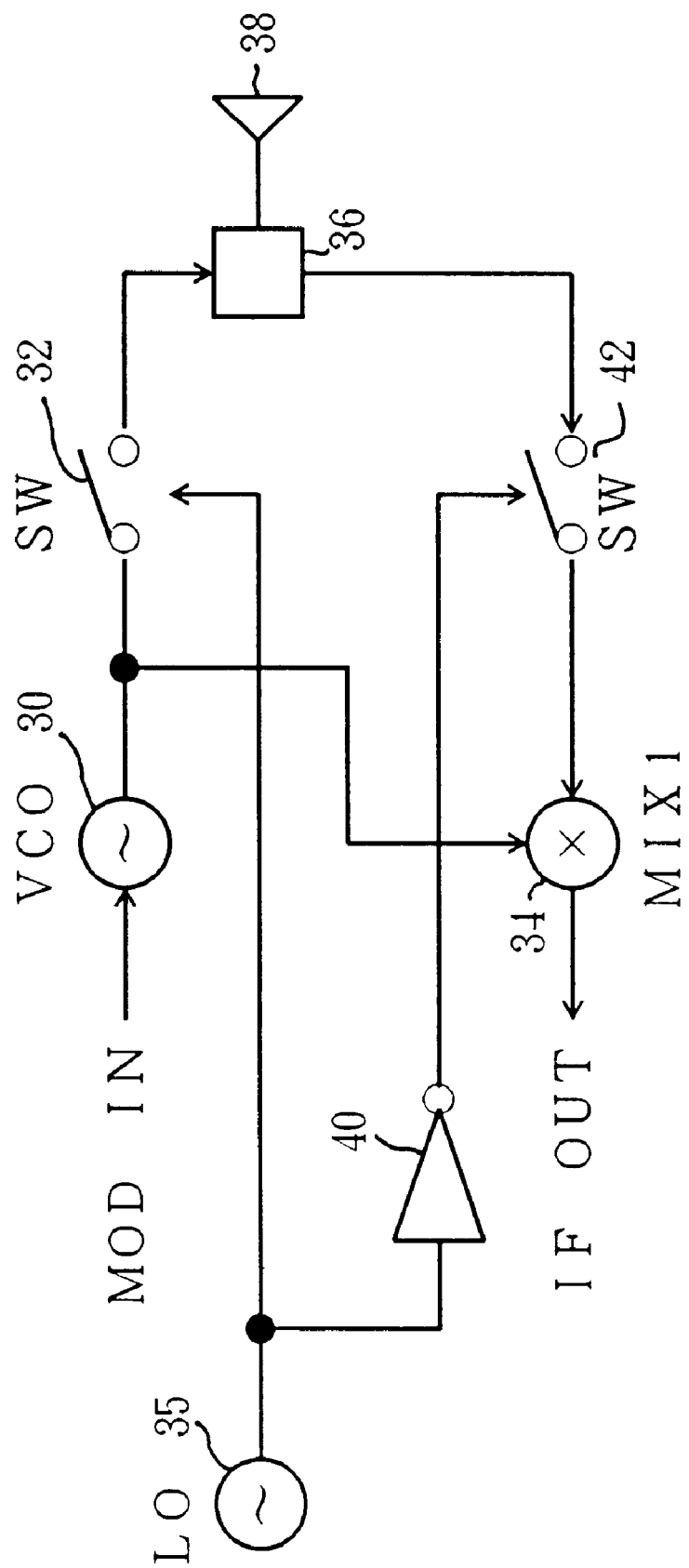
FIG. 4 is a block diagram of a radar apparatus according to a first embodiment of the present invention.

FIG. 4 is a block diagram of a radar apparatus according to a first embodiment of the present invention. Referring to FIG. 4, a triangular baseband signal (Mod) having a frequency of about several kHz is applied to a voltage controlled oscillator (VCO) 30 for frequency modulation. The resultant frequency modulated signal having a frequency $f_0$ on the order of 10–100 GHz is supplied to a transmission switch (SW) 32. A portion of the frequency modulated signal is supplied to a reception mixer 34. The transmission switch 32 is controlled to be opened or closed in accordance with a drive signal output from a switch drive signal source (LO) 35. The drive signal has a frequency $f_{SW}$ on the order of 10–100 MHz and is a rectangular wave with a 50% duty factor. When the switch 32 is closed, the frequency modulated signal to be transmitted is supplied to an antenna 38 via antenna sharing means 36.

The drive signal output from the switch drive signal source 35 is inverted by an inverter 40 and supplied to a reception switch 42. Accordingly, when the transmission switch 32 is open, the reception switch 42 is closed so that a received signal received via the antenna 38 is supplied to the reception mixer 34 via the antenna sharing means 36 and the reception switch 42. The reception mixer 34 produces and outputs the IF signal.

Figure 5:
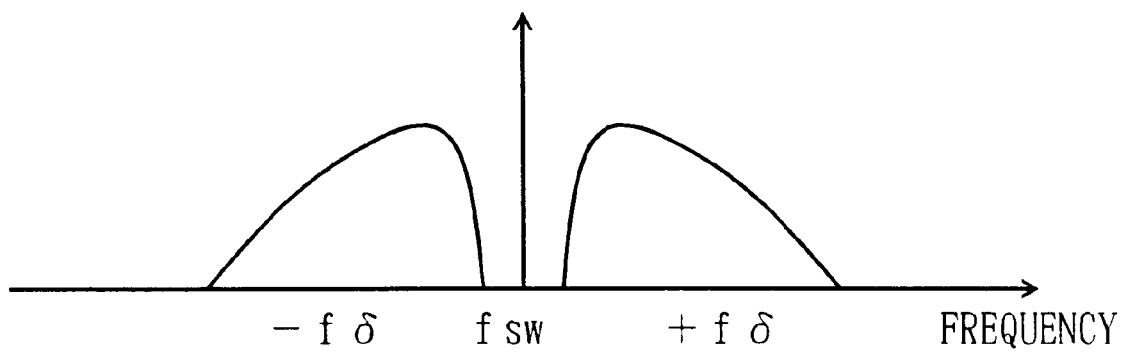
FIG. 5 shows a frequency spectrum of an IF signal.

The frequency of the received signal received via the antenna 38 is given by $f_0+f\delta$. As a result of frequency conversion by the reception switch 42, a signal having frequencies between $f_0+f\delta-f_{SW}$ and $f_0+f\delta+f_{SW}$ is obtained. Accordingly, the reception mixer 34 produces the IF signal having frequencies between $f_{SW}-f\delta$ and $f_{SW}+f\delta$ and having the frequency spectrum as shown in FIG. 5.

The IF signal is subject to FM modulation in order to detect the frequency $f\delta$. The frequency $f\delta$ of a period in which the frequency increases and the frequency $f\delta$ in a period in which the frequency decreases are used as a basis to calculate the relative speed and the distance with respect to the target object.

Figure 6A:
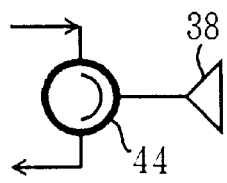
FIGS. 6A, 6B and 6C show constructions of antenna sharing means.
Figure 6B:
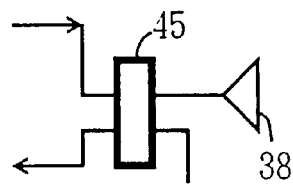
Figure 6C:
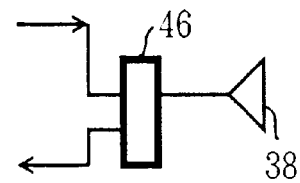

The antenna sharing means 36 may be implemented by a circulator 44 as shown in FIG. 6A, a 90° hybrid circuit 45 as shown in FIG. 6B or a branch circuit 46 as shown in FIG. 6C. The attenuation provided by the circulator 44 is approximately 2–3 dB. The attenuation provided by the 90° hybrid circuit 45 and the branch circuit 46 is approximately 3–4 dB.

Figure 7A:
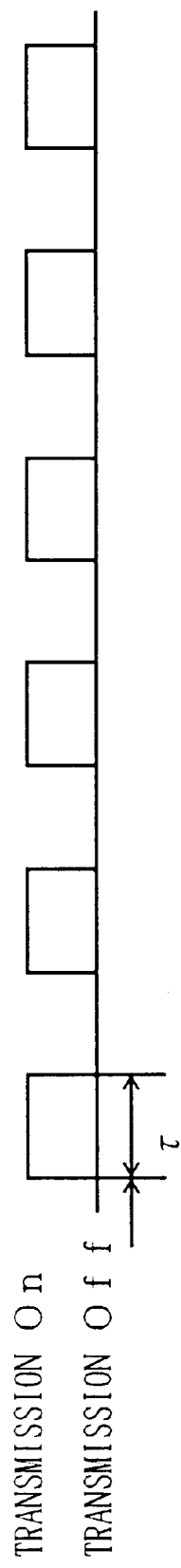
FIGS. 7A, 7B and 7C are timing charts for signals occurring in the apparatus shown in FIG. 4.
Figure 7B:
Figure 7C:
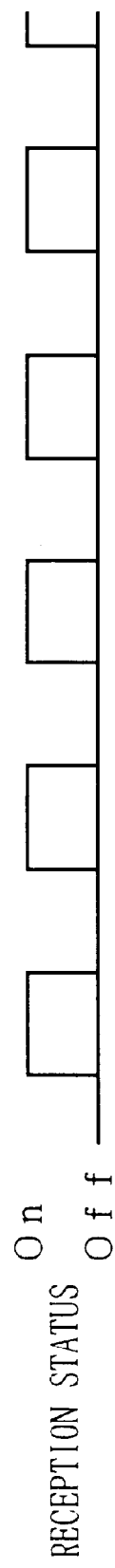

As shown in FIG. 7A, transmission of a signal via the antenna 38 occurs in response to the closing of the transmission switch 32 by the drive signal. The reflected signal as shown in FIG. 7B reflected by the target object arrives at the antenna 38. As shown in FIG. 7C, a portion of the reflected signal is received by the antenna 38 in response to the closing of the reception switch 42.

Thus, since a single antenna is shared in transmission and reception operations, the radar apparatus produced accordingly can be small and inexpensive.

Figure 8:
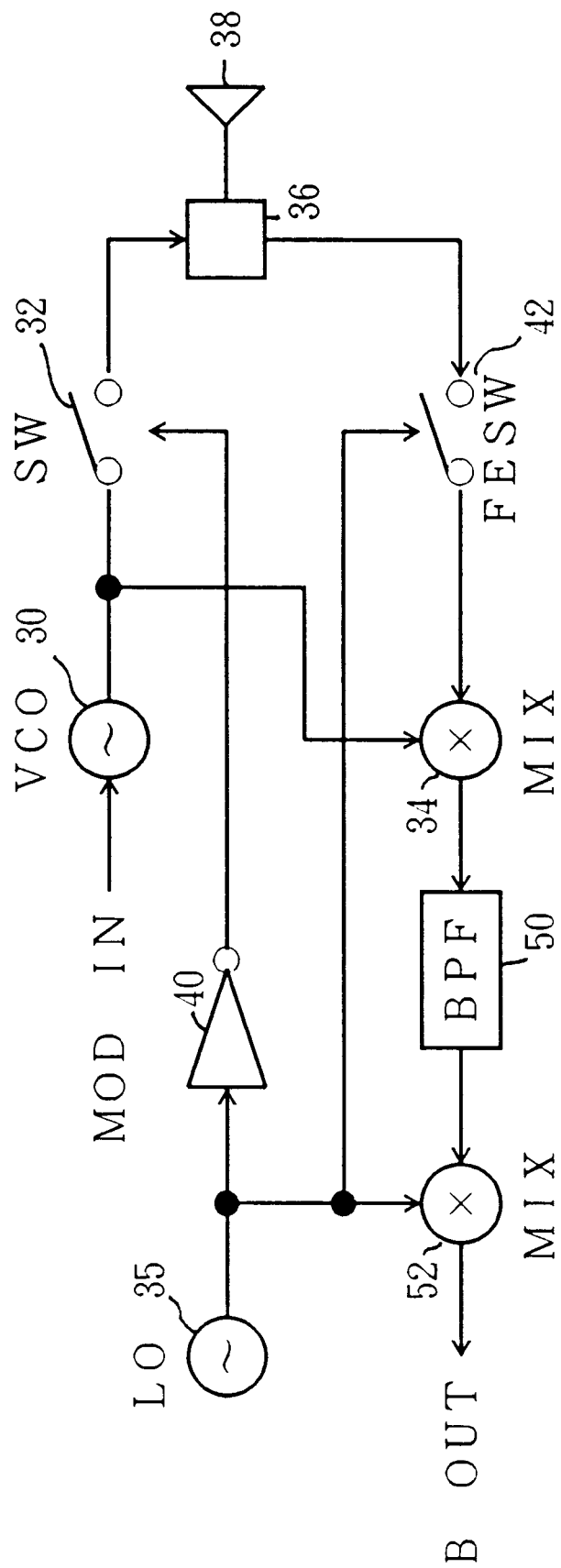
FIG. 8 is a block diagram of a radar apparatus according to a second embodiment of the present invention.

FIG. 8 is a block diagram of a radar apparatus according to a second embodiment. Referring to FIG. 8, a triangular baseband signal (Mod) having a frequency on the order of 100–1000 Hz is applied to the voltage controlled oscillator (VCO) 30 for frequency modulation. The resultant frequency modulated signal having a frequency $f_0$ on the order of 10–100 GHz is supplied to the transmission switch (SW) 32. A portion of the frequency modulated signal is branched off to the reception mixer 34. The transmission switch 32 is controlled to be opened or closed in accordance with the drive signal output from the switch drive signal source (LO) 35. The drive signal has a frequency $f_{SW}$ on the order of 10–100 MHz and is a rectangular wave with a 50% duty factor. When the switch 32 is closed, the frequency modulated signal to be transmitted is supplied to the antenna 38 via the antenna sharing means 36.

The drive signal output from the switch drive signal source 35 is inverted by the inverter 40 and supplied to the reception switch 42. Accordingly, when the transmission switch 32 is open, the reception switch 42 is closed so that a received signal received via the antenna 38 is supplied to the reception mixer 34 via the antenna sharing means 36 and the reception switch 42. The reception mixer 34 produces and outputs the IF signal.

The frequency of the received signal received via the antenna 38 is given by $f_0+f\delta$. As a result of frequency conversion by the reception switch 42, a signal having frequencies between $f_0+f\delta-f_{SW}$ and $f_0+f\delta+f_{SW}$ is obtained. Accordingly, the reception mixer 34 produces the IF signal having frequencies between $f_{SW}-f\delta$ and $f_{SW}+f\delta$ and having the frequency spectrum as shown in FIG. 5. Due to the AM demodulating function of the reception mixer 34, a noise component having a frequency on the order of 100–1000 Hz caused by amplitude variation of the frequency modulated signal is contained in the IF signal. By supplying the IF signal to the band-pass filter 50 so that only the frequency band between $f_{SW}-f\delta$ and $f_{SW}+f\delta$ on the order of 10–100 MHz is allowed to pass, the noise having the frequency on the order of 100–1000 Hz can be removed. The IF signal is fed to a mixer 52. The mixer 52 produces and outputs a beat signal having a frequency of $f\delta$ by mixing the IF signal having the frequencies between $f_{SW}-f\delta$ and $f_{SW}+f\delta$ and having the noise removed, with the drive signal having the frequency $f_{SW}$.

Figure 9:
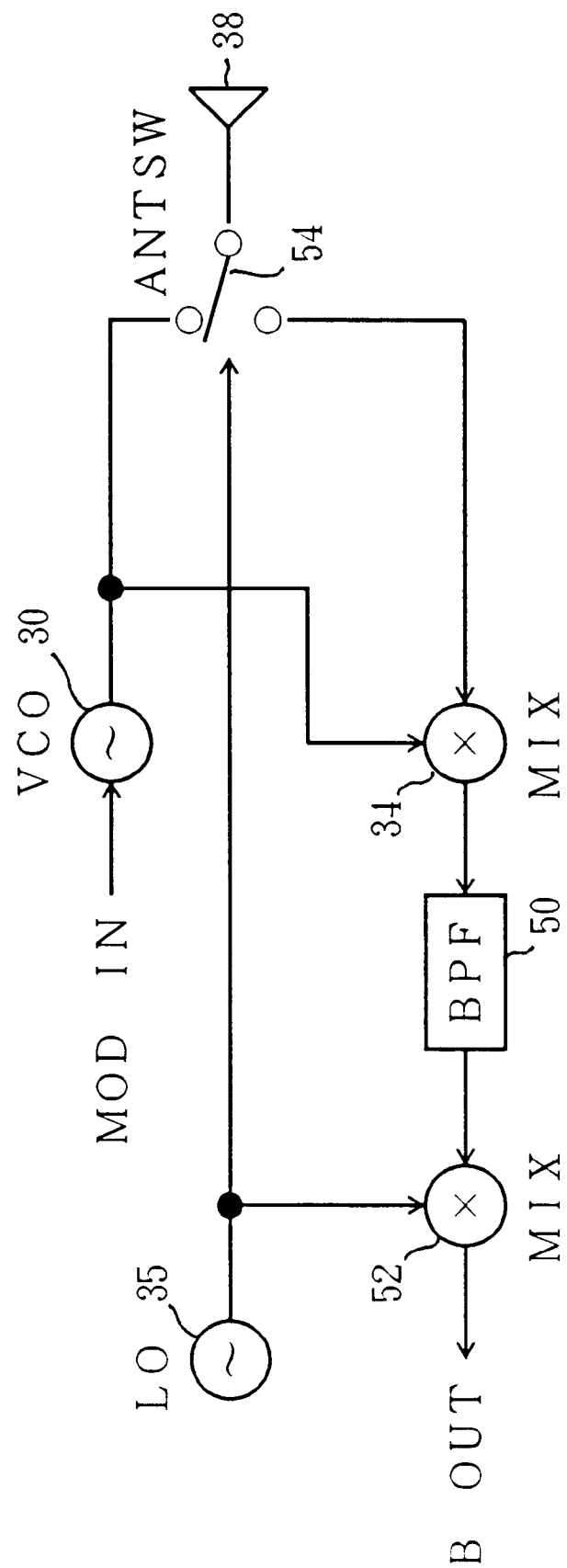
FIG. 9 is a block diagram of a radar apparatus according to a third embodiment of the present invention.

FIG. 9 is a block diagram of a radar apparatus according to a third embodiment of the present invention. A triangular baseband signal (Mod) having a frequency on the order of 100–1000 Hz is applied to the voltage controlled oscillator (VCO) 30 for frequency modulation. The resultant frequency modulated signal having a frequency $f_0$ on the order of 10–100 GHz is supplied to a single-port double-throw (SPDT) switch (SW) 54. A portion of the frequency modulated signal is branched off to the reception mixer 34. The SPDT switch 54 is controlled to be connected to the VCO 30 while the drive signal output from the drive signal source (LO) 35 is at logical high and to the reception mixer 34 while the drive signal is at logical low. The drive signal has a frequency $f_{SW}$ on the order of 10–100 MHz and is a rectangular wave with a 50% duty factor. While the drive signal is at logical high, the frequency modulated signal is supplied to the antenna 38 and output therefrom.

The received signal received via the antenna 38 while the drive signal is at logical low is supplied to the reception mixer 34 via the SPDT switch 54. The reception mixer 34 produces and outputs the IF signal.

The received signal received via the antenna 38 has the frequency $f_0+f\delta$. As a result of frequency conversion by the reception switch 42, a signal having frequencies between $f_0+f\delta-f_{SW}$ and $f_0+f\delta+f_{SW}$ is produced and supplied to the reception mixer 34 which then produces the IF signal having frequencies between $f_{SW}-f\delta$ and $f_{SW}+f\delta$ and having the frequency spectrum shown in FIG. 5. Due to the AM demodulating function of the reception mixer 34, the IF signal contains a noise having a frequency on the order of 100–1000 Hz caused by amplitude variation of the frequency modulated signal. By supplying the IF signals to the band-pass filter 50 so that only the frequency band between $f_{SW}-f\delta$ and $f_{SW}+f\delta$ on the order of 10–100 MHz is allowed to pass, the noise having the frequency on the order of 100–1000 Hz can be removed. The IF signal is then fed to a mixer 52. The mixer 52 produces and outputs a beat signal having a frequency of $f\delta$ by mixing the IF signal having the frequencies between $f_{SW}-f\delta$ and $f_{SW}+f\delta$ and having the noise removed, with the drive signal having the frequency $f_{SW}$.

Figure 10:
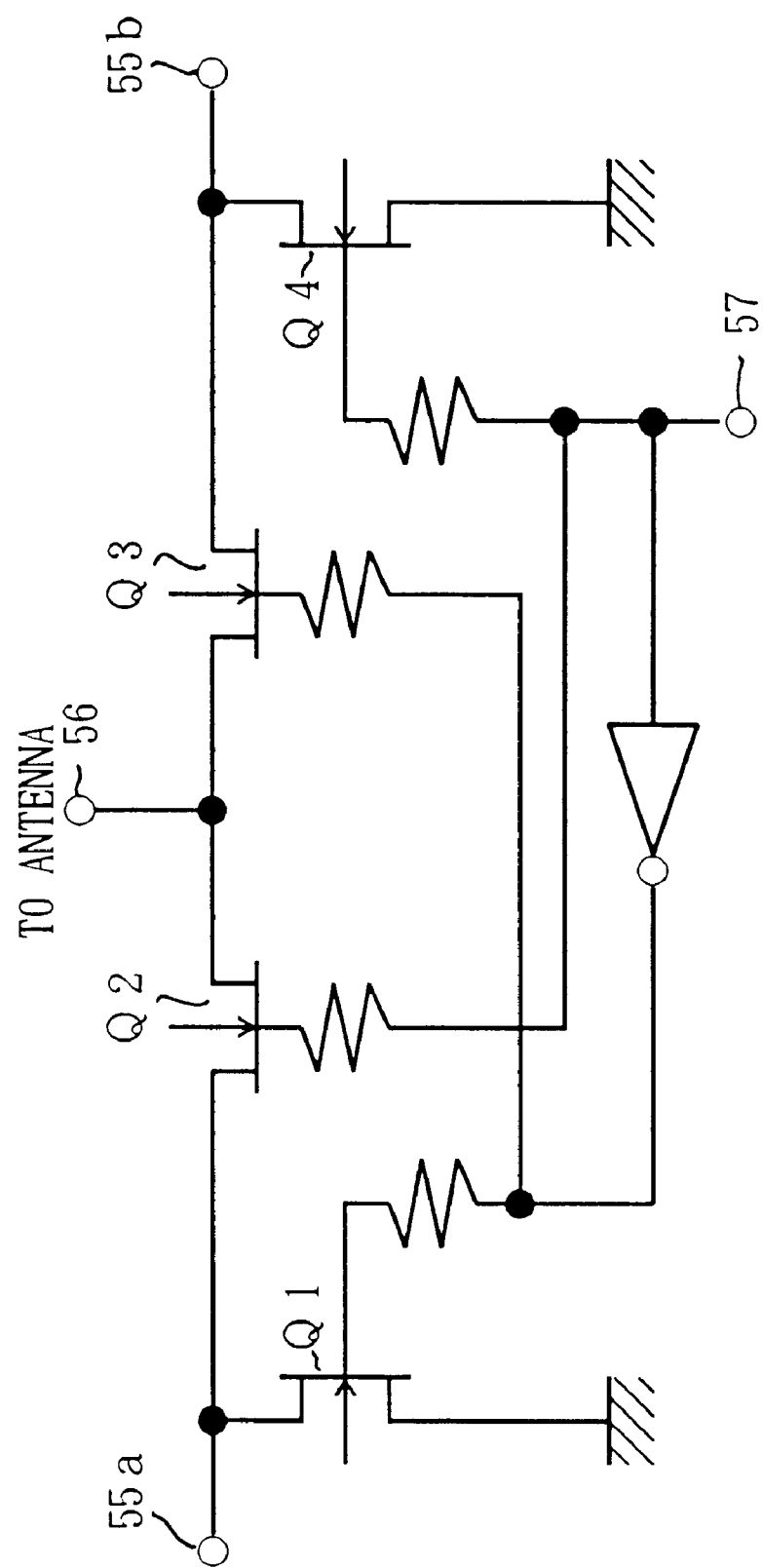
FIG. 10 shows a circuit diagram of an SPDT switch.

The SPDT switch has a circuitry as shown in FIG. 10. Referring to FIG. 10, terminals 55a and 55b are connected to the voltage controlled oscillator 30 and the reception mixer 34, respectively. A terminal 56 is connected to the antenna 38. The drive signal is supplied to a terminal 57. While the drive signal is at logical high, n-channel MOS transistors Q2 and Q4 are ON and n-channel MOS transistors Q1 and Q3 are OFF so that the terminals 55a and 56 are connected to each other and the terminal 55b is grounded. While the drive signal is at logical low, the n-channel MOS transistors Q1 and Q3 are ON and the n-channel MOS transistors Q2 and Q4 are OFF so that the terminals 55b and 56 are connected to each other and the terminal 55a is grounded.

Figure 11:
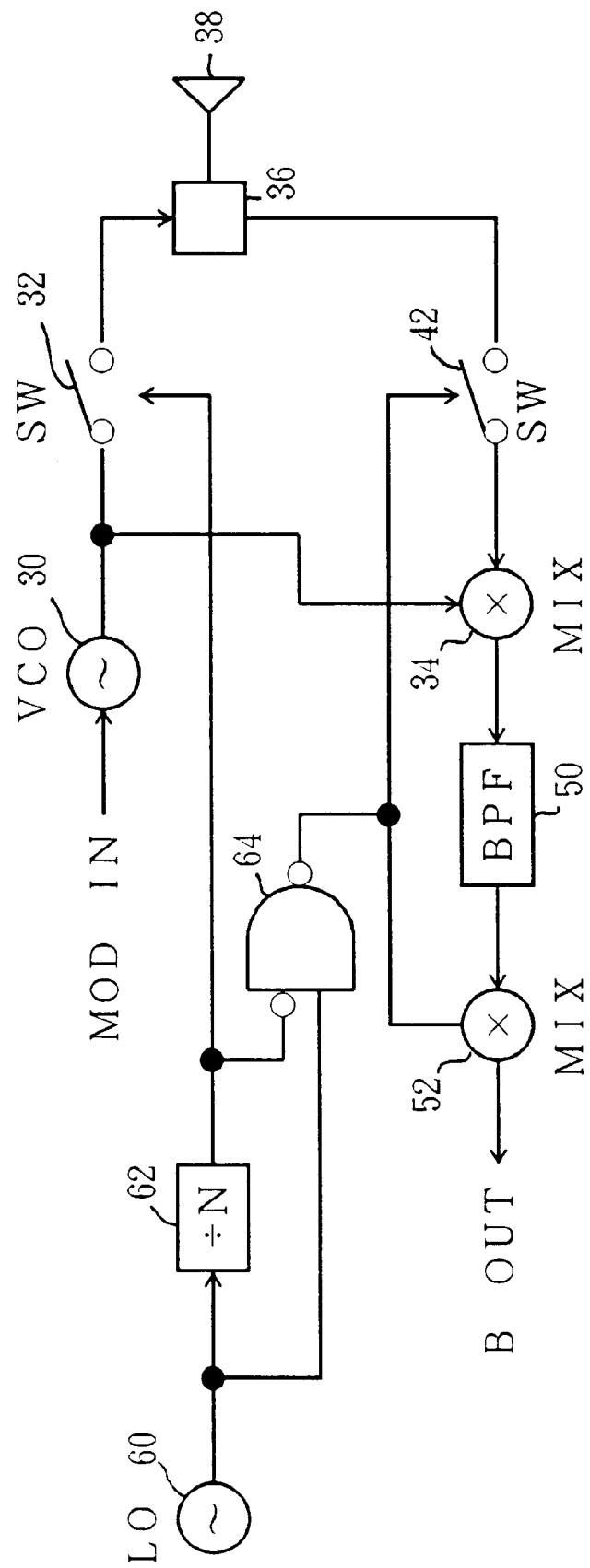
FIG. 11 is a block diagram of a radar apparatus according to a fourth embodiment of the present invention.

FIG. 11 is a block diagram of a radar apparatus according to a fourth embodiment of the present invention. Referring to FIG. 11, a triangular baseband signal (Mod) having a frequency on the order of 100–1000 Hz is applied to the voltage controlled oscillator (VCO) 30 for frequency modulation. The resultant frequency modulated signal having a frequency $f_0$ on the order of 10–100 GHz is supplied to the transmission switch (SW) 32. A portion of the frequency modulated signal is supplied to the reception mixer 34. The transmission switch 32 is controlled to be opened or closed in accordance with a drive signal obtained by subjecting an output signal from the switch drive signal source (LO) 60 to 1/N frequency division by a frequency divider 62, where N is 5–20, for example. The drive signal output from the frequency divider 62 has a frequency $f_{SW}$ on the order of 10–100 MHz and is a rectangular wave with a 50% duty factor. When the switch 32 is closed, the frequency modulated signal to be transmitted is supplied to the antenna 38 via the antenna sharing means 36.

The drive signal output from the switch drive signal source 60 is supplied to a NAND circuit 64 together with the drive signal output from the frequency divider 62. While the drive signal is at logical low, a signal having a frequency $N*f_{SW}$ is supplied from the NAND circuit 64 to the reception switch 42. Accordingly, when the transmission switch 32 is open, the reception switch 42 is opened or closed at the frequency $N*f_{SW}$. While the reception switch 42 is closed, the received signal received via the antenna 38 is supplied to the reception mixer 34 via the antenna sharing means 36 and the reception switch 42. The reception mixer 34 produces and outputs the IF signal.

The frequency of the received signal received via the antenna 38 is given by $f_0+f\delta$. As a result of frequency conversion by the reception switch 42, a signal having frequencies between $f_0+f\delta-N*f_{SW}$ and $f_0+f\delta+N*f_{SW}$ is obtained. Accordingly, the reception mixer 34 produces an IF signal having frequencies between $N*f_{SW}-f\delta$ and $N*f_{SW}+f\delta$. Due to the AM demodulating function of the reception mixer 34, a noise having a frequency on the order of 100–1000 Hz caused by amplitude variation of the frequency modulated signal is contained in the IF signal. By supplying the IF signal to the band-pass filter 50 so that only the frequency band between $N*f_{SW}-f\delta$ and $N*f_{SW}+f\delta$ on the order of 10–100 MHz is allowed to pass, the noise having the frequency on the order of 100–1000 Hz can be removed. The IF signal is then fed to the mixer 52. The mixer 52 produces and outputs a beat signal having a frequency of $f\delta$ by mixing the IF signal having the frequencies between $N*f_{SW}-f\delta$ and $N*f_{SW}+f\delta$ and having the noise removed, with the drive signal having the frequency $N*f_{SW}$ output from the NAND circuit 64.

Generally, a semiconductor device contains a 1/f noise. The lower the frequency, the higher the level of the noise. The switching frequency of the reception switch 42 according to the fourth embodiment described above is configured to be N times that of the switching frequency of the foregoing embodiments so that the 1/f noise generated in the reception mixer 34 is reduced and the S/N ratio is improved.

Figure 12A:
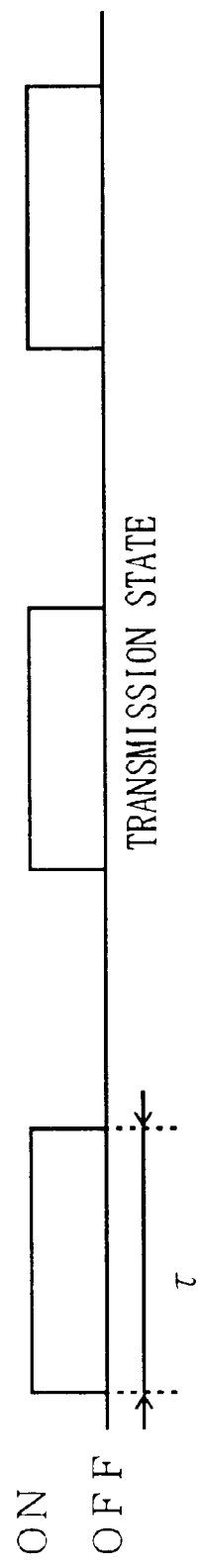
FIGS. 12A, 12B and 12C are timing charts for signals occurring in the apparatus shown in FIG. 11.
Figure 12B:
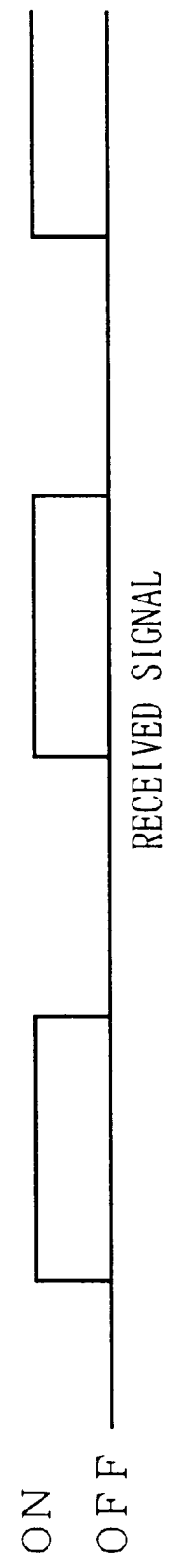
Figure 12C:
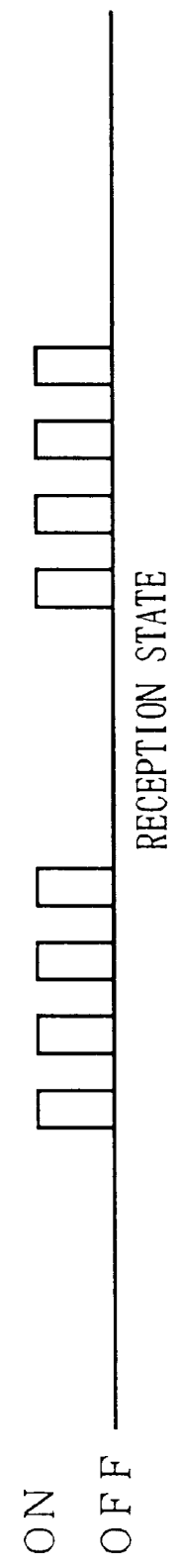

The drive signal closes the transmission switch 32 so as to time the transmission of the transmitted signal via the antenna 38 as shown in FIG. 12A. The signal reflected by the target object arrives at the antenna 38 as shown in FIG. 12B. Reception of a portion of the reflected signal via the antenna 38 is timed as shown in FIG. 12C by closing the reception switch 42.

Figure 13:
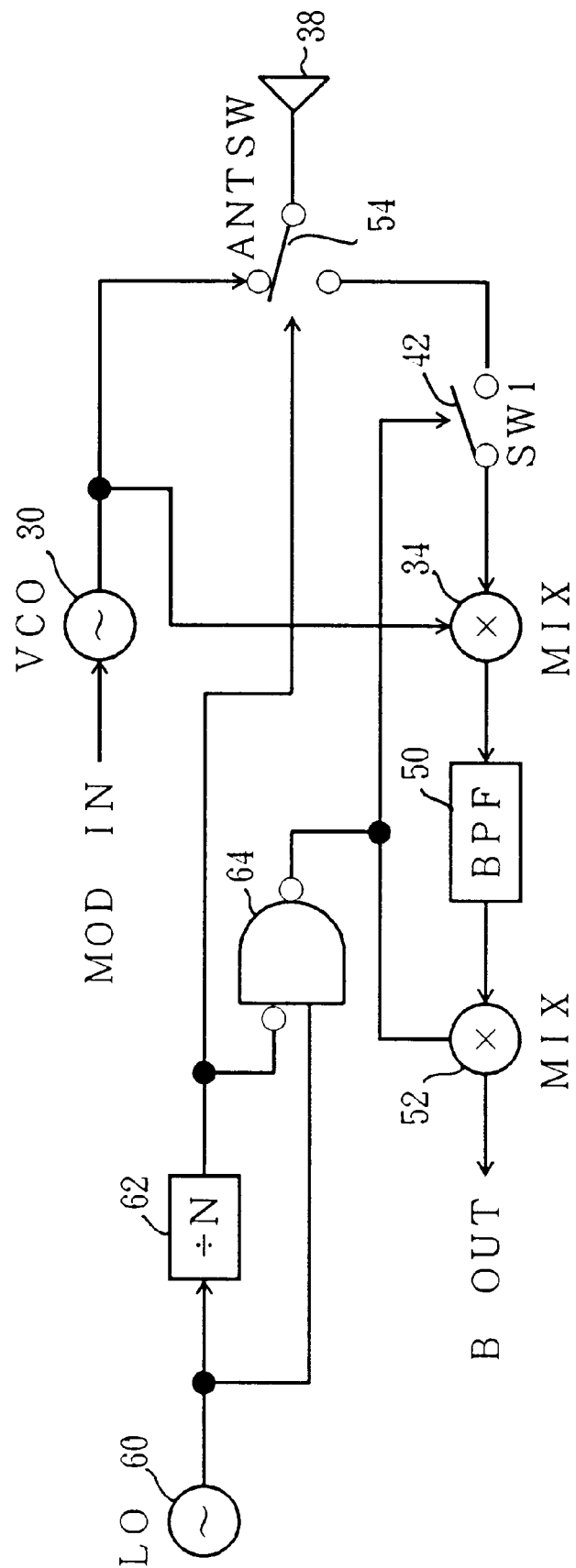
FIG. 13 is a block diagram of a radar apparatus according to a fifth embodiment of the present invention.

FIG. 13 is a block diagram of a radar apparatus according to a fifth embodiment. Referring to FIG. 13, a triangular baseband signal (Mod) having a frequency on the order of 100–1000 Hz is applied to the voltage controlled oscillator (VCO) 30 for frequency modulation. The resultant frequency modulated signal having a frequency $f_0$ on the order of 10–100 GHz is supplied to the single-port double-throw (SPDT) switch (SW) 54. A portion of the frequency modulated signal is branched off to the reception mixer 34. The SPDT switch 54 is controlled to be connected to the VCO 30 while the drive signal obtained by subjecting an output signal from the switch drive signal source (LO) 60 to 1/N frequency division is at logical high and to the reception switch 42 while the drive signal is at logical low. The drive signal has a frequency $f_{SW}$ on the order of 10–100 MHz and is a rectangular wave with a 50% duty factor. While the drive signal is at logical high, the frequency modulated signal is supplied to the antenna 38 via the SPDT switch 54 and output therefrom.

The drive signal output from the switch drive signal source 60 is supplied to the NAND circuit 64 together with the drive signal output from the frequency divider 62. While the drive signal is at logical low, a signal having a frequency $N*f_{SW}$ is supplied from the NAND circuit 64 to the reception switch 42. Accordingly, while the SPDT switch 54 is connected to the reception switch 42, the reception switch 42 is opened or closed at the frequency $N*f_{SW}$. While the reception switch 42 is closed, the received signal received via the antenna 38 is supplied to the reception mixer 34 via the SPDT switch 54 and the reception switch 42. The reception mixer 34 produces and outputs the IF signal.

The frequency of the received signal received via the antenna 38 is given by $f_0+f\delta$. As a result of frequency conversion by the reception switch 42, a signal having frequencies between $f_0+f\delta-N*f_{SW}$ and $f_0+f\delta+N*f_{SW}$ is obtained. Accordingly, the reception mixer 34 produces an IF signal having frequencies between $N*f_{SW}-f\delta$ and $N*f_{SW}+f\delta$. Due to the AM demodulating function of the reception mixer 34, a noise having a frequency on the order of 100–1000 Hz caused by amplitude variation of the frequency modulated signal is contained in the IF signal. By supplying the IF signal to the band-pass filter 50 so that only the frequency band between $N*f_{SW}-f\delta$ and $N*f_{SW}+f\delta$ on the order of 10–100 MHz is allowed to pass, the noise having the frequency on the order of 100–1000 Hz can be removed. The IF signal is then fed to the mixer 52. The mixer 52 produces and outputs a beat signal having a frequency of $f\delta$ by mixing the IF signal having the frequencies between $N*f_{SW}-f\delta$ and $N*f_{SW}+f\delta$ and having the noise removed, with the drive signal having the frequency $N*f_{SW}$ output from the NAND circuit 64.

The switching frequency of the reception switch 42 according to the fifth embodiment described above is configured to be N times that of the switching frequency of the first through third embodiments so that the 1/f noise generated in the reception mixer 34 is reduced and the S/N ratio is improved.

Figure 14:
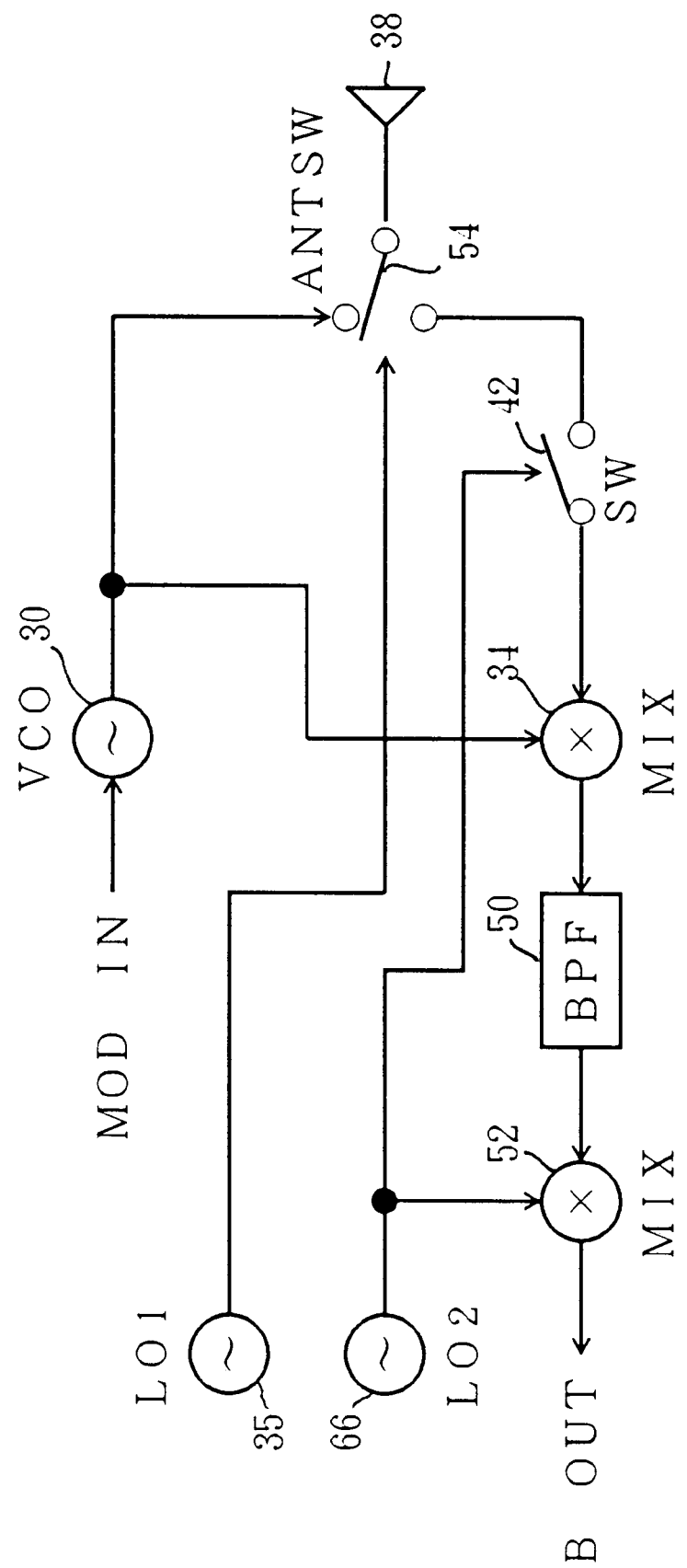
FIG. 14 is a block diagram of a radar apparatus according to a sixth embodiment of the present invention.

FIG. 14 is a block diagram of a radar apparatus according to a sixth embodiment of the present invention. Referring to FIG. 14, a triangular baseband signal (Mod) having a frequency on the order of 100–1000 Hz is applied to the voltage controlled oscillator (VCO) 30 for frequency modulation. The resultant frequency modulated signal having a frequency $f_0$ on the order of 10–100 GHz is supplied to the single-port double-throw (SPDT) switch (SW) 54. A portion of the frequency modulated signal is branched off to the reception mixer 34. The SPDT switch 54 is controlled to be connected to the VCO 30 while the drive signal output from the switch drive signal source (LO) 35 is at logical high and to the reception switch 42 while the drive signal is at logical low. The drive signal has a frequency $f_{SW}$ on the order of 10–100 MHz and is a rectangular wave with a 50% duty factor. While the drive signal is at logical high, the frequency modulated signal is supplied to the antenna 38 via the SPDT switch 54 and transmitted from the antenna 38.

While the drive signal is at logical low, the received signal received via the antenna 38 is supplied to the reception switch 42 via the SPDT switch 54. The reception switch 42 and the mixer 52 are supplied with a signal having a frequency $N*f_{SW}$ output from a switch drive signal source 66. Accordingly, while the SPDT switch 54 is connected to the reception switch 42, the reception switch 42 is opened or closed at the frequency $N*f_{SW}$. While the reception switch 42 is closed, the received signal received via the antenna 38 is supplied to the reception mixer 34 via the SPDT switch 54 and the reception switch 42. The reception mixer 34 produces and outputs the IF signal.

The frequency of the received signal received via the antenna 38 is given by $f_0+f\delta$. As a result of frequency conversion by the reception switch 42, a signal having frequencies between $f_0+f\delta-N*f_{SW}$ and $f_0+f\delta+N*f_{SW}$ is obtained. Accordingly, the reception mixer 34 produces an IF signal having frequencies between $N*f_{SW}-f\delta$ and $N*f_{SW}+f\delta$. Due to the AM demodulating function of the reception mixer 34, a noise having a frequency on the order of 100–1000 Hz caused by amplitude variation of the frequency modulated signal is contained in the IF signal. By supplying the IF signal to the band-pass filter 50 so that only the frequency band between $N*f_{SW}-f\delta$ and $N*f_{SW}+f\delta$ on the order of 10–100 MHz is allowed to pass, the noise having the frequency on the order of 100–1000 Hz can be removed. The IF signal is then fed to the mixer 52. The mixer 52 produces and outputs a beat signal having a frequency of $f\delta$ by mixing the IF signal having the frequencies between $N*f_{SW}-f\delta$ and $N*f_{SW}+f\delta$ and having the noise removed, with the drive signal having the frequency $N*f_{SW}$ output from the NAND circuit 64.

The switching frequency of the reception switch 42 according to the sixth embodiment described above is configured to be N times that of the switching frequency of the first through third embodiments so that the 1/f noise generated in the reception mixer 34 is reduced and the S/N ratio is improved.

In the sixth embodiment, transmission and reception switching is conducted using the drive signal having a 50% duty factor. Assuming a transmission period of $\tau$, the drive signal frequency of $f_{SW}$ and a maximum distance $R_{max}$ measurable in a reception period, a reception power decreases when a distance $R_t$ to the target object is shorter than the distance $R_{max}$, as shown in FIG. 15. When the distance $R_t$ is $2*N*R_{max}$, where N is a natural number, the reception intensity is 0 so that the measurement is disabled. The measure $2*N*R_{max}$ is referred to as a fade-out point. Since the time-division transmission and reception is performed in the sixth embodiment, the reception intensity is in inverse proportion to the power of $R_t$ when $R_t \leq R_{max}$. When $R_{max} \leq R_t \leq 2*R_{max}$, the reception intensity is in inverse proportion to the sixth power of $R_t$.

Figure 16:
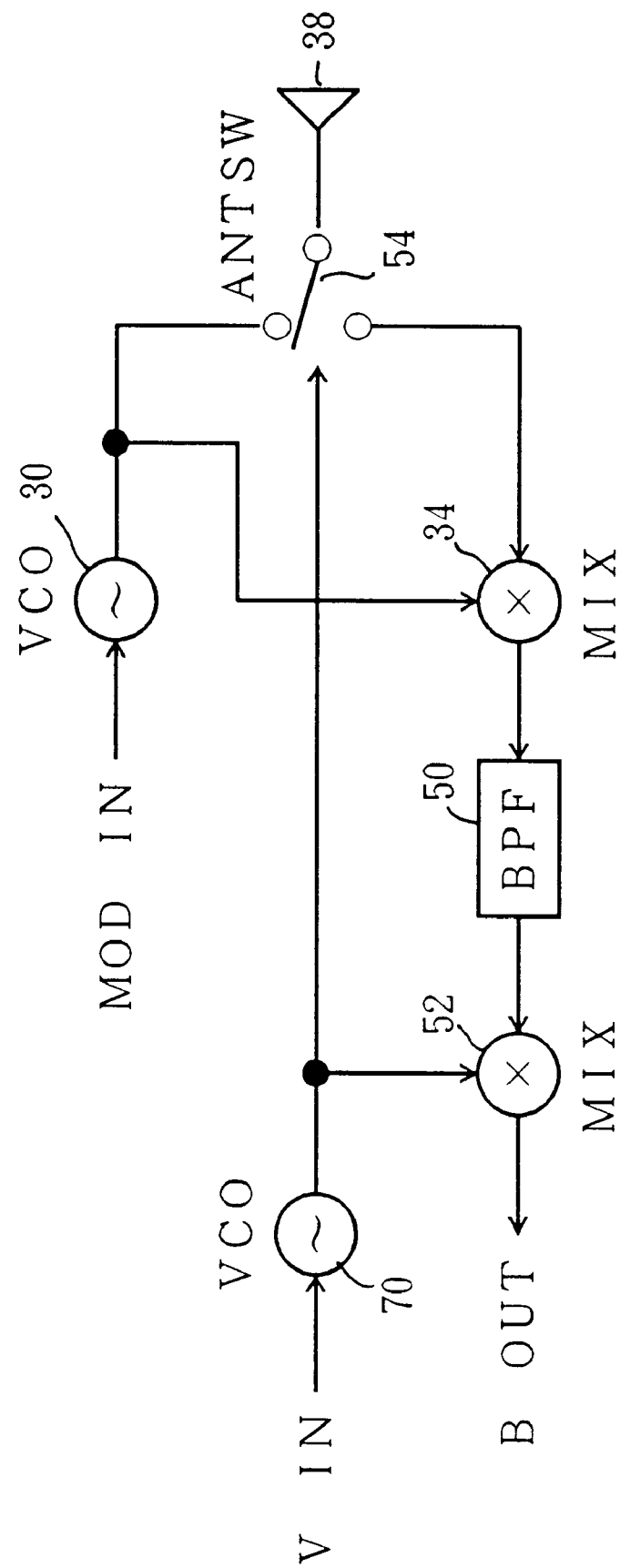
FIG. 16 is a block diagram of a radar apparatus according to a seventh embodiment of the present invention.

FIG. 16 is a block diagram of a radar apparatus according to a seventh embodiment of the present invention. Referring to FIG. 16, a triangular baseband signal (Mod) having a frequency on the order of 100–1000 Hz is applied to the voltage controlled oscillator (VCO) 30 for frequency modulation. The resultant frequency modulated signal having a frequency $f_0$ on the order of 10–100 GHz is supplied to the single-port double-throw (SPDT) switch (SW) 54. A portion of the frequency modulated signal is branched off to the reception mixer 34. The SPDT switch 54 is controlled to be connected to the VCO 30 while the drive signal output from a voltage controlled oscillator (VCO) 70 is at logical high and to the reception mixer 34 while the drive signal is at logical low. The drive signal has a variable frequency $f_{SW}$ between 9 MHz and 11 MHz, for example, and is a rectangular wave with a 50% duty factor. While the drive signal is at logical high, the frequency modulated signal is supplied to the antenna 38 via the SPDT switch 54 and transmitted from the antenna 38. While the drive signal is at logical low, the received signal received via the antenna 38 is supplied to the reception mixer 34 via the SPDT switch 54. The reception mixer 34 then produces and outputs the IF signal.

The IF signal has a noise having a frequency below 100 Hz removed by the band-pass filter 50 and is then supplied to the mixer 52. The mixer 52 produces a beat signal having a frequency fδ by frequency conversion and outputs the beat signal.

Figure 17A:
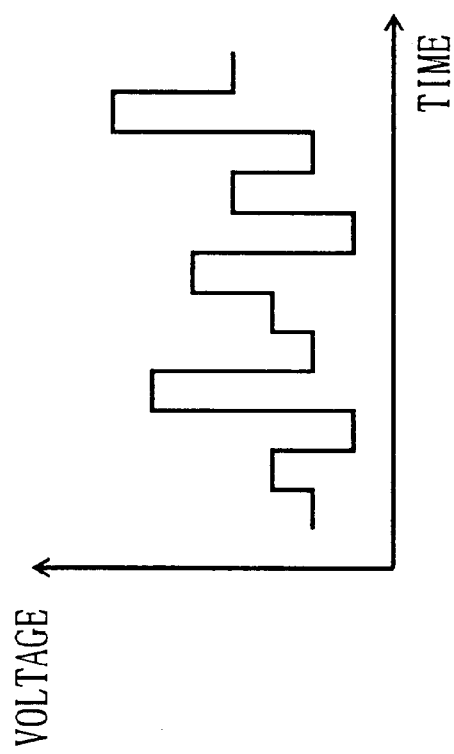
FIGS. 17A and 17B are waveform charts of a voltage applied to a control terminal of the voltage controlled oscillator.
Figure 17B:
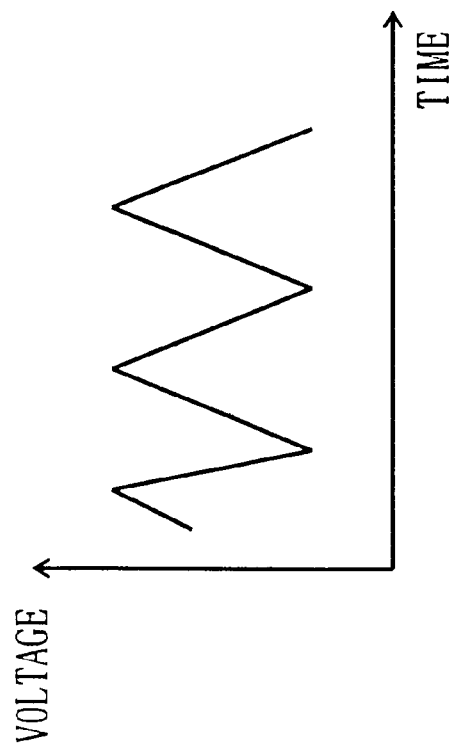

A triangular wave as shown in FIG. 17A or a control voltage ($V_{in}$) having a random hopping waveform as shown in FIG. 17B is supplied to a control terminal of the voltage controlled oscillator 70. The frequency $f_{SW}$ of the drive signal output from the voltage controlled oscillator 70 varies between 9 MHz and 11 MHz in accordance with the control voltage. Accordingly, a distance to the fade-out point varies in a range between 13.64 X N m and 16.66 X N m. Therefore, the distance $R_t$ to the target object can be properly detected. By raising a variation frequency at which the frequency $f_{SW}$ of the drive signal varies so as to be at least on the order of 100–1000 Hz, it is possible to prevent the noise having the frequency on the order of 100–1000 Hz from being leaked to the IF signals due to the AM demodulating function of the reception mixer 34.

The variation frequency of the frequency $f_{SW}$ of the drive signal as shown in FIG. 17A is suitably higher than the beat frequency derived from the relative speed and the distance with respect to the target object. Another requirement for the variation frequency is that a variation of the distance to the target object is not in synchronism with a variation of the distance to the fade-out point determined by the variation frequency. For example, given that the maximum relative speed with respect to the target object is 180 km/h, fade-out points occur at varying locations in a 3 m range, when N=1. The period of the variation of the frequency $f_{SW}$ of the drive signal is suitably shorter than 60 msec.

Figure 18:
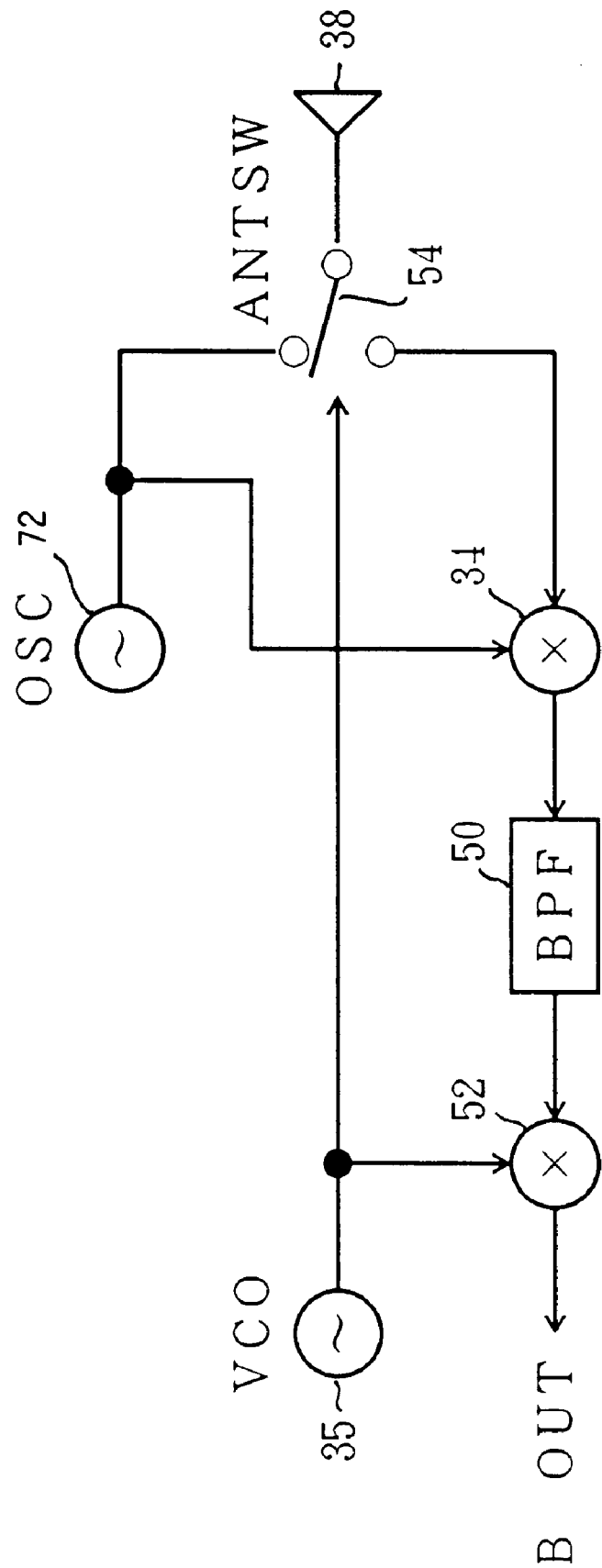
FIG. 18 is a block diagram of a radar apparatus according to an eighth embodiment of the present invention.

FIG. 18 is a block diagram of a radar apparatus according to an eighth embodiment of the present invention. Referring to FIG. 18, an oscillator (OSC) 72 outputs an oscillation having a frequency on the order of 10–100 GHz. The oscillation is supplied to the single-port double-throw (SPDT) switch (SW) 54. A portion of the oscillation is branched off to the reception mixer 34. The SPDT switch 54 is controlled to be connected to the OSC 72 while the drive signal output from the switch drive signal source (LO) 35 is at logical high and to the reception mixer 34 while the drive signal is at logical low. The drive signal has a frequency $f_{SW}$ on the order of 10–100 MHz and is a rectangular wave with a 50% duty factor. While the drive signal is at logical high, the frequency modulated signal is supplied to the antenna 38 via the SPDT switch 54 and transmitted from the antenna 38. While the drive signal is at logical low, the received signal received via the antenna 38 is supplied to the reception mixer 34 via the SPDT switch 54. The reception mixer 34 then produces and outputs the IF signal.

The IF signal has a noise having a frequency below 100 Hz removed by the band-pass filter 50 and is then supplied to the mixer 52. The mixer 52 produces a beat signal having a frequency fδ by frequency conversion and outputs the beat signal.

The eighth embodiment described above is used as a Doppler radar capable of detecting only a relative speed with respect to the target object. For example, given that $f_{SW}$=100 MHz, $R_{max}$=0.75 m so that the fade-out point is 1.5 m. Generally, a Doppler radar applied to an automobile is used to detect a ground speed, wherein the frequency of the drive signal can be relatively high because the target object (in this case, the ground) is a short distance away.

Similar to the first through seventh embodiments, the eighth embodiment makes it possible for the antenna 38 to be shared in transmission and reception. Thus, the cost and price of the radar apparatus according to these embodiments can be reduced.

Figure 19:
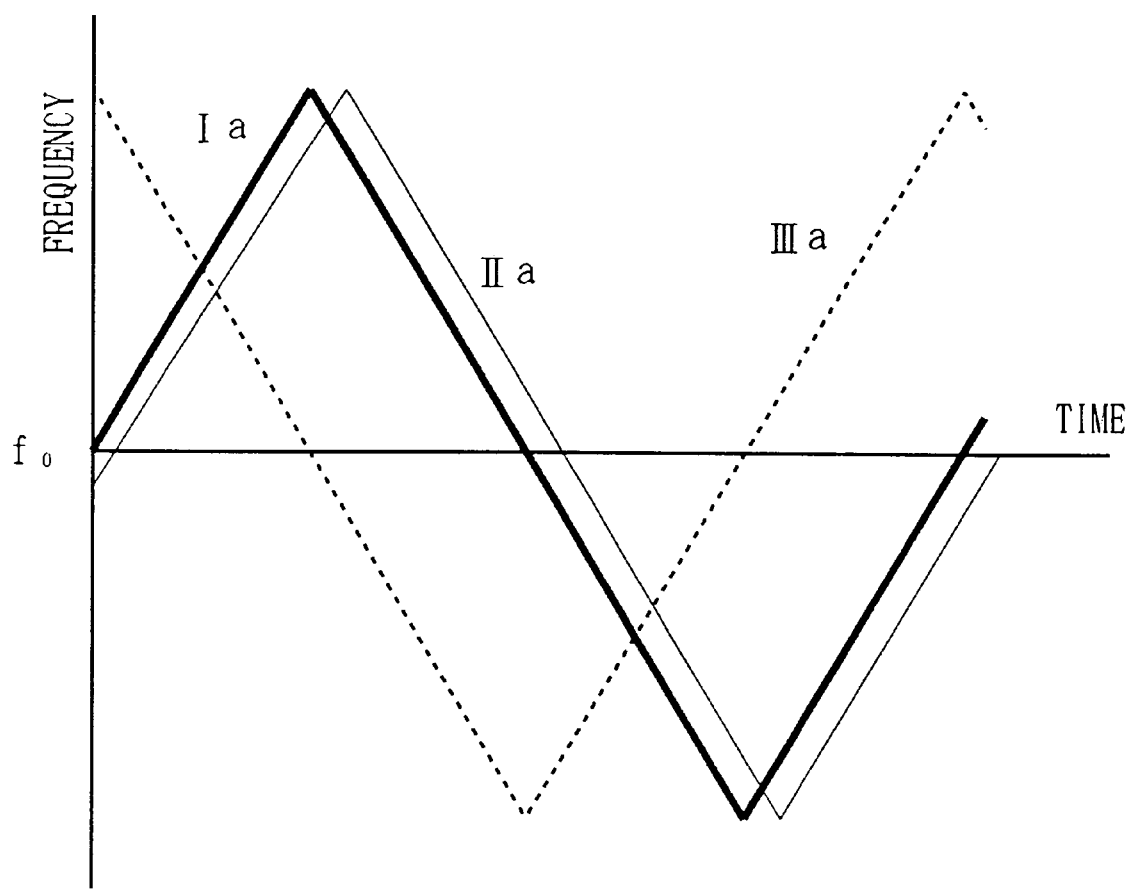
FIG. 19 is a graph illustrating how an interference occurs.

In an FMCW radar, a triangular modulating signal is applied to a voltage controlled oscillator so that a signal indicated by the symbol Ia in FIG. 19 is transmitted. A signal indicated by the symbol IIa is reflected by the target object with a delay and is mixed with a portion of the transmitted wave which portion forms a local oscillation source in the reception mixer. A minute frequency difference between the reflected wave and the local oscillation source is detected by the reception mixer so that the distance to the target object is calculated. In the case of an FMCW radar, the greater the distance, that is, the greater the delay, the greater the frequency difference and the higher the baseband output frequency of the received signal. If there is a difference in speed between the target object and the automobile, a Doppler shift is caused. The frequency difference that corresponds to the Doppler shift is observed as a beat signal. The frequency of the beat signal would generally be below 100 kHz if the triangular modulating signal has a frequency on the order of 100–1000 Hz, the frequency deviation of the FM modulated wave output from the voltage controlled oscillator is on the order of 10–100 MHz, the frequency used by the radar is on the order of 10–100 GHz, the distance to the target object is on the order of 100–1000 m, and the relative speed with respect to the target object is on the order of 10–100 km/h.

A wave indicated by the symbol IIIa of FIG. 19 represents an interference from another FMCW radar. It is very unlikely that a frequency variation of a radar of one vehicle is in synchronism with that of another vehicle causing an interference. FIG. 19 gives a general idea of how an interference occurs.

Figure 20:
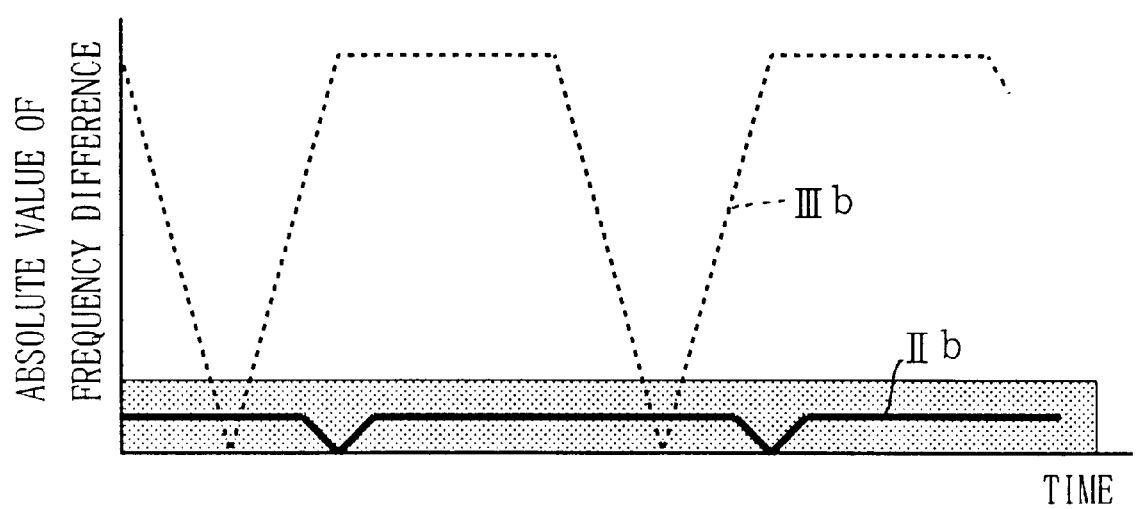
FIG. 20 is a graph illustrating how an interference occurs.

FIG. 20 shows a time-dependent variation of the frequency of the signal that occurs in the received signal baseband output. The solid line IIb of FIG. 20 indicates a beat signal generated due to the signal reflected by the target object, the solid line IIIb indicates a beat signal generated due to an interfering signal, and the hatching indicates a passing band of the reception filter for improving the S/N ratio of the received signal. The cut-off frequency of the reception filter is determined by the distance and the relative speed to be detected. As mentioned before, the cut-off frequency on the order of 100–1000 kHz is used for the automobile radar.

The frequency of the interfering wave IIIb varies from a dc range to a frequency significantly higher than the frequency of the reception filter. The frequency of the interfering wave may vary till it is on the order of 100–200 MHz, in a case that the local oscillation source and the interference source have matching center frequencies, identical frequency deviations and reversed phases of the frequency variation.

Figure 21:
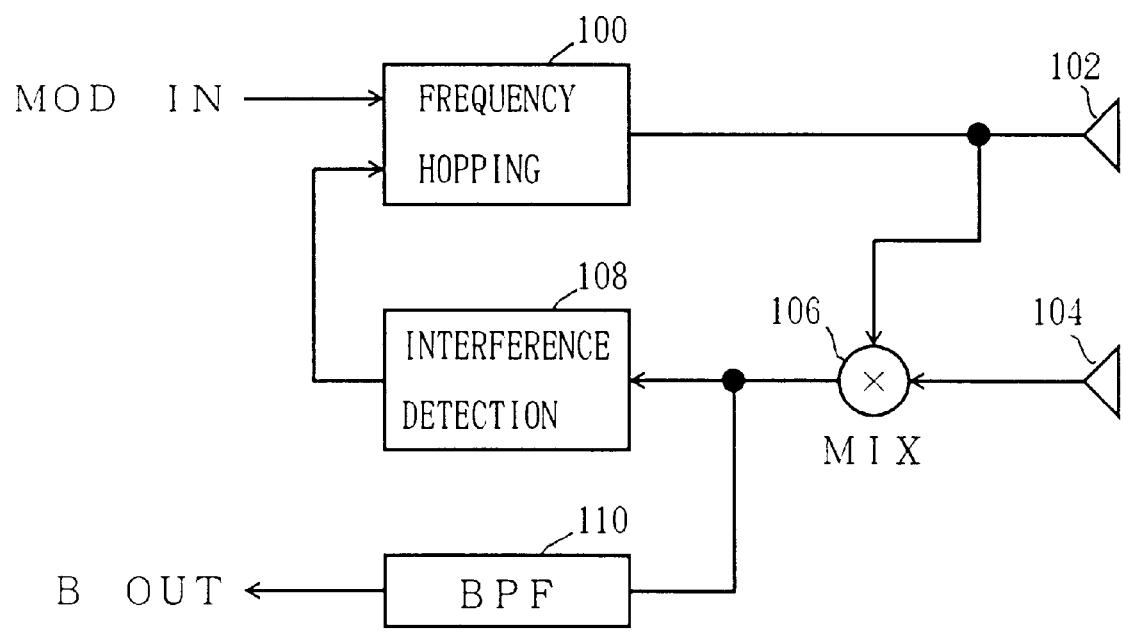
FIG. 21 is a block diagram of a radar apparatus according to a ninth embodiment of the present invention.

FIG. 21 is a block diagram of a radar apparatus according to a ninth embodiment of the present invention. Referring to FIG. 21, a triangular modulating signal is supplied to a frequency hopping means 100. A frequency modulated signal output from the frequency hopping means 100 is supplied to a transmission antenna 102 and transmitted therefrom. A portion of the frequency modulated signal is branched off to a reception mixer 106. The signal received via a reception antenna 104 is mixed with the frequency modulated signal in the reception mixer 106 so as to produce a beat signal. The beat signal is supplied to an interference detecting means 108 and a reception filter implemented by a band-pass filter 110.

The interference detecting means 108 detects whether or not there is an interference and supplies the detection result to the frequency hopping means 100. In the event that there is an interference, the frequency hopping means 100 changes the frequency of the frequency modulated signal to a new frequency in a band where there is no interference. The band-pass filter 110, in which the cut-off frequency determined by the distance and the relative speed to be detected is set, removes unwanted frequency components from the beat signal and outputs the rectified signal. A low-pass filter may be used in place of the band-pass filter.

Figure 22A:
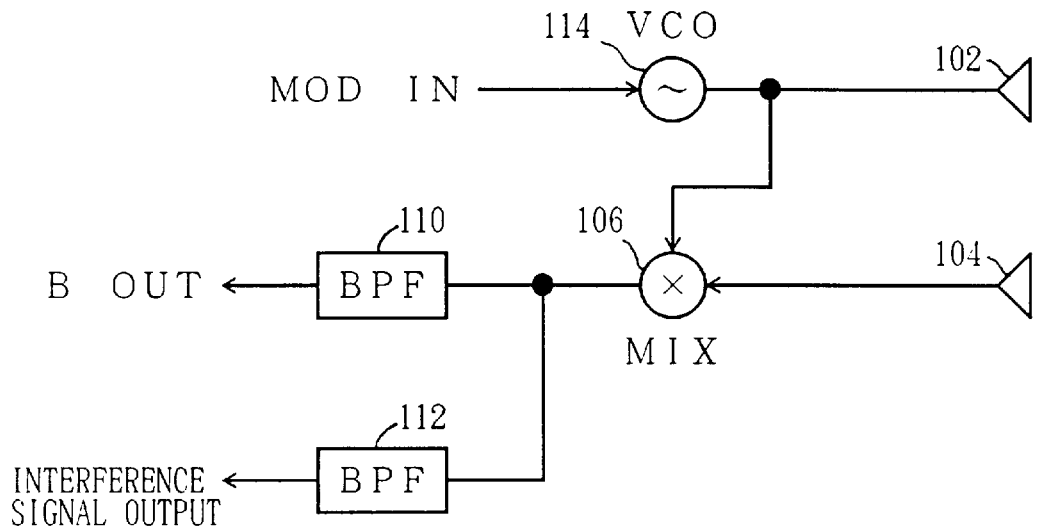
FIGS. 22A and 22B show implementations of interference detecting means.

As shown in FIG. 22A, the interference detecting means 108 may be implemented by a band-pass filter 112 so as to detect by band separation an interfering signal having a frequency higher than that of the beat signal. That is, the signal represented by IIIb of FIG. 20 providing a frequency difference that exceeds the band of the reception filter is subject to band separation and output. A high-pass filter may be employed in place of the band-pass filter 112. A voltage controlled oscillator 114 shown in FIG. 22a forms a part of the frequency hopping means 100. A lower cut-off frequency of the band-pass filter 112 is configured to be higher than the higher cut-off frequency of the band-pass filter 110. A satisfactory attenuation is provided at a crossing point between the attenuation curves of the band-pass filters.

Figure 22B:
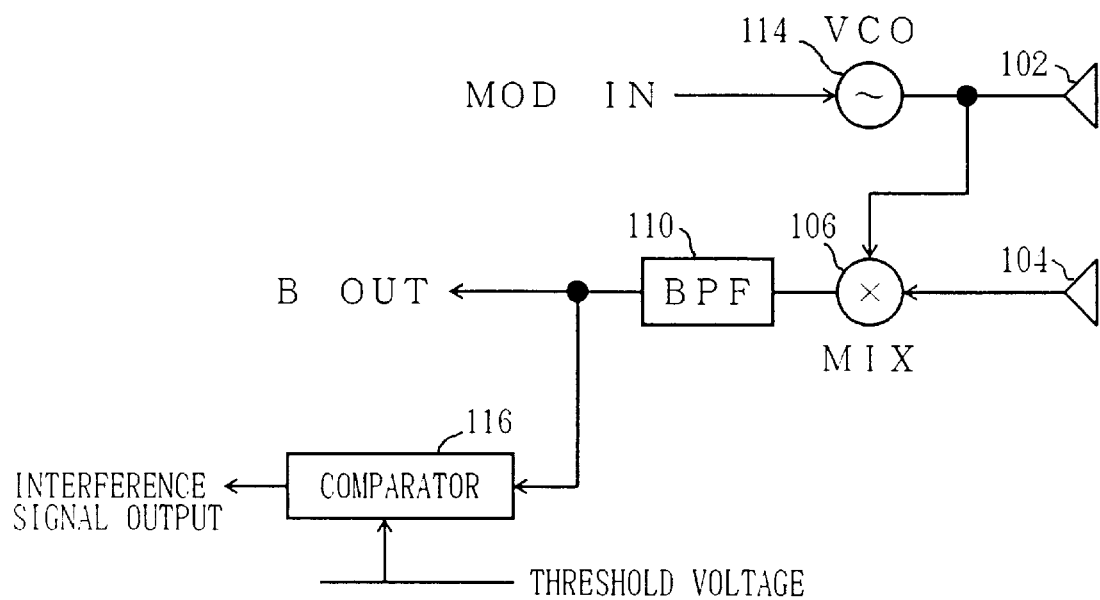

As shown in FIG. 22B, the band-pass filter 110 for extracting the received signal may be coupled to the output of the reception mixer 106. A comparator 116 operated by a predetermined threshold voltage may be used as the interference detecting means 108.

Generally an automobile radar outputs a power of about 10 dBm. Therefore, the reflected power provided an automobile 100 m ahead, for example, is approximately −130 dBm at best. The reflected power is in inverse proportion to the fourth power of the distance. In comparison with this, the interfering power from the opposite lane is in inverse proportion to the power of the distance and is therefore, significantly higher than the power of the received signal. As shown in FIG. 20, when an automobile radar is exposed to an interference from a radar of another automobile, a level of the beat signal caused by the interfering signal drops to the band of the reception filter for a limited period of time. When this drop occurs, the interfering signal becomes a pulse signal having a significantly higher level than the signal reflected by the target object. Thus, in the interference detecting means of FIG. 22B, the threshold voltage is set so that the comparator 116 operates at a sufficiently higher level than the level of the signal reflected by the target object.

FIG. 23 is a block diagram of the frequency hopping means (frequency varying means) 100. Referring to FIG. 23, an interference detection signal which goes to a logical high state when an interference is detected and is obtained in the interference detecting means is supplied to a rising detecting circuit 120. The rising detecting circuit 120 generates a pulse each time a rising of the interfering signal is detected. The pulses are supplied to an N-pulse counter 122 which is reset when a total of N pulses are input thereto. A ROM table 124 contains data relating to the center frequency of the hopping destination. A count output by the N-pulse counter 122 is supplied to the ROM table 124 as an address for reading M-bit data. A D/A converter 126 generates a dc signal that corresponds to the M-bit data output from the ROM table 124. An adder circuit 128 for adding the triangular modulating signal to the output signal from the D/A converter 126 is coupled to the D/A converter 126. An output from the adder circuit 128 is supplied to a voltage controlled oscillator 114.

Upon detection of an interference wave by the interference detecting means 108, the frequency hopping means is put into operation so as to shift the center frequency to a frequency band free from interference. Even when an interference is caused in the hopping destination, another step for frequency hopping is taken. Of course, the minimum interval of the frequency in hopping must be the same as or higher than the frequency deviation of the FMCW radar. For example, given that the frequency deviation is 75 MHz, and the assigned frequency bandwidth is 1 GHz, the hopping frequency interval is 75 MHz at the minimum. A total of thirteen channels are available as hopping destination frequencies.

Figure 24:
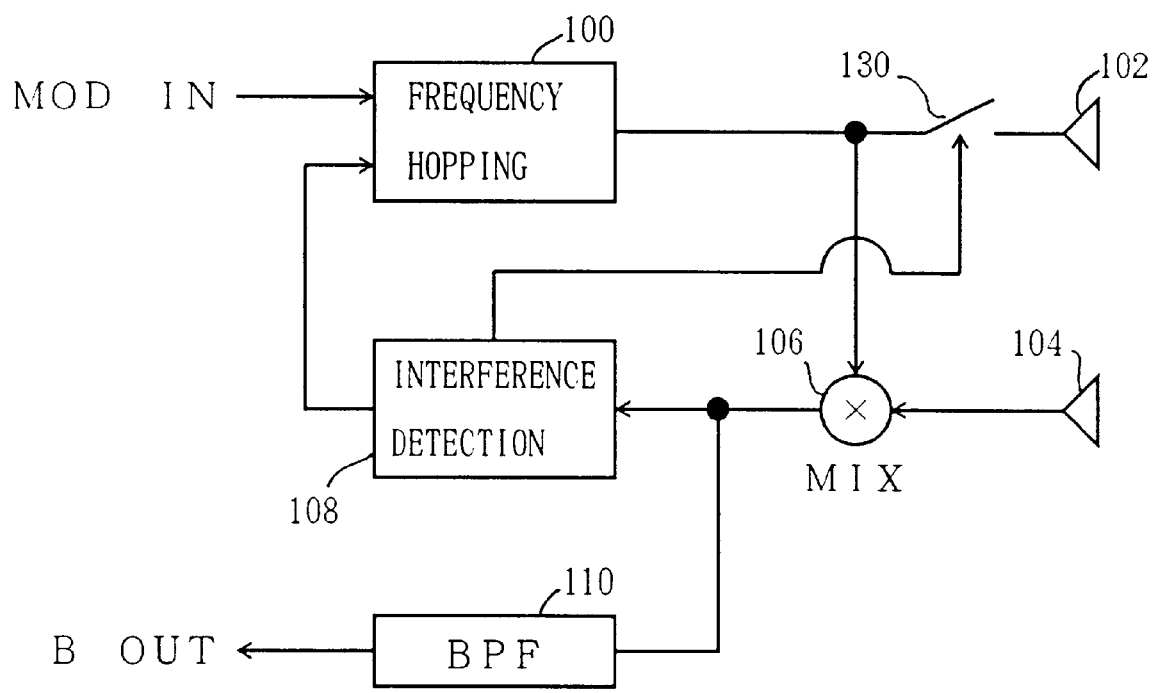
FIG. 24 is a block diagram of a radar apparatus according to a tenth embodiment of the present invention.

FIG. 24 is a block diagram of a radar apparatus according to a tenth embodiment of the present invention. Referring to FIG. 24, a triangular modulating signal is supplied to the frequency hopping means 100 and then to a switch 130 coupled to the output of the frequency hopping means 100. When the switch is closed, a frequency modulated signal is supplied to the transmission antenna 102 and transmitted therefrom. A portion of the frequency modulated signal is branched off to the reception mixer 106. The signal received via the reception antenna 104 is mixed by the reception mixer 106 with the frequency modulated signal so as to produce a beat signal. The beat signal is supplied to the interference detecting means 108 and a reception filter implemented by the band-pass filter 110.

The interference detecting means 108 detects whether or not there is an interference and supplies the detection result to the frequency hopping means 100. In the event that there is an interference, the frequency hopping means 100 changes the frequency of the frequency modulated signal to a new frequency in a band where there is no interference. The band-pass filter 110, in which the cut-off frequency determined by the distance and the relative speed to be detected is set, removes unwanted frequency components from the baseband signal and outputs the resultant signal.

In the tenth embodiment, a determination is made before transmission as to whether or not there is an interference. In the event that there is an interference, the frequency hopping means 100 changes the center frequency of the transmitted signal. When the interference is no longer present, the switch 130 is closed so that the transmission is started. With this arrangement, it is possible to select a transmission frequency free from interference.

Figure 25:
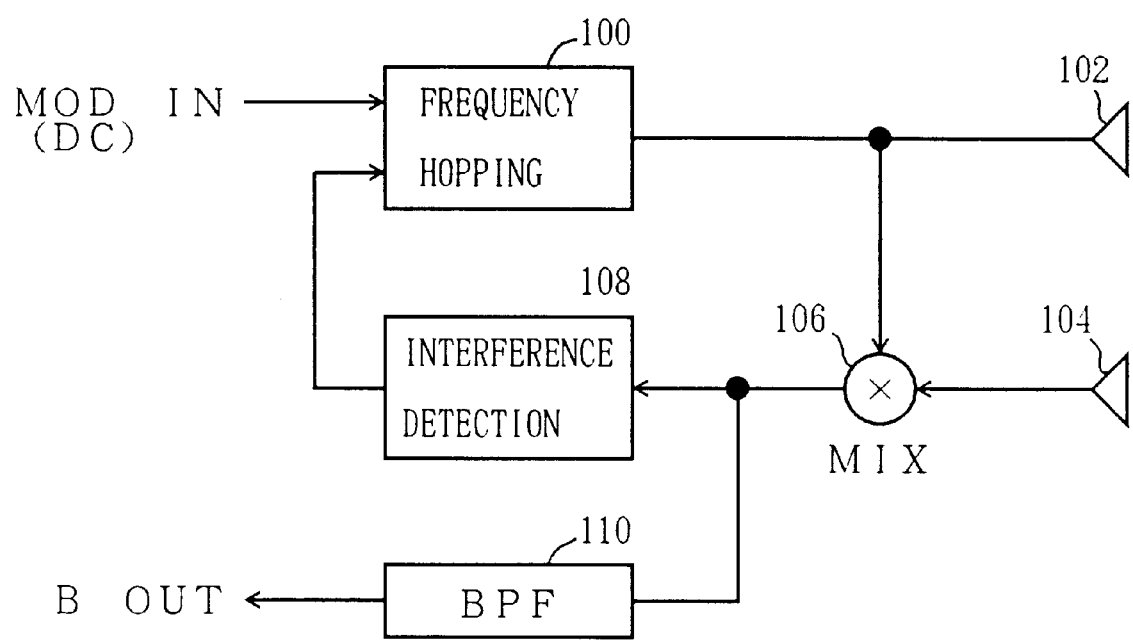
FIG. 25 is a block diagram of a radar apparatus according to an eleventh embodiment.

FIG. 25 is a block diagram of a radar apparatus according to an eleventh embodiment of the present invention. The construction of the eleventh embodiment is almost the same as the construction shown in FIG. 21, a difference being that the modulating signal supplied to the frequency hopping means 100 is a constant-level dc signal instead of a triangular wave. That is, the radar as shown in FIG. 25 is a Doppler radar. A Doppler radar is used to detect the ground speed and is not used to measure a distance. A Doppler radar is constructed of a transmission oscillation source oscillating at a constant frequency, a local oscillation source provided by branching a portion of the oscillation of the transmission oscillation source, and a reception frequency converter. FIGS. 19 and 20 illustrate how an interference occurs in the radar apparatus according to the eleventh embodiment. That is, considering a case where an FMCW radar causes an interference in another FMCW radar, the description as given with reference to FIGS. 21–23 applies to the apparatus of FIG. 25.

The present invention is not limited to the above-described embodiments, and variations and modifications may be made without departing from the scope of the present invention.

What is claimed is:

1. A radar apparatus, comprising:
   an oscillator that generates a frequency modulated signal;
   a reception mixer, coupled to said oscillator, that generates an IF signal by mixing the frequency modulated signal and a received signal formed by the frequency modulated signal reflected from a target, the IF signal indicating a distance to the target and a relative speed of the target; and
   an antenna that alternatingly transmits the frequency modulated signal in a transmission mode and receives the received signal in a reception mode, said antenna alternating between the transmission mode and the reception mode in accordance with a drive signal.

2. The radar apparatus as claimed in claim 1, wherein responsive to the drive signal said antenna alternates between the transmission mode and the reception mode at a frequency in excess of double a modulating frequency of the frequency modulated signal.

3. The radar apparatus as claimed in claim 1, further comprising:
   an antenna sharing unit, coupled to said antenna, that receives the received signal therefrom;
   a transmission switch that supplies said frequency modulated signal to said antenna sharing unit based on the drive signal;
   a reception switch, coupled to said antenna sharing unit, that supplies the received signal to said reception mixer based on an inversion of the drive signal.

4. The radar apparatus as claimed in claim 3, wherein said antenna sharing unit includes a circulator.

5. The radar apparatus as claimed in claim 3, wherein said antenna sharing unit includes a 90° hybrid circuit.

6. The radar apparatus as claimed in claim 3, wherein said antenna sharing unit includes a branch circuit.

7. The radar apparatus as claimed in claim 1, further comprising a single-pole double-throw switch that alternatingly couples said antenna to said oscillator and to said reception mixer.

8. The radar apparatus as claimed in claim 1, further comprising an interference detection unit, coupled to said reception mixer, that detects in the received signal an interfering signal received from another radar apparatus.

9. The radar apparatus as claimed in claim 8, further comprising a frequency varying unit that varies a center frequency of the frequency modulated signal when the interfering signal is detected.

10. A radar apparatus, comprising:
    an oscillator that generates a frequency modulated signal;
    a reception mixer, coupled to said oscillator, that generates an IF signal by mixing the frequency modulated signal and a received signal formed by the frequency modulated signal reflected from a target, the IF signal indicating a distance to the target and a relative speed of the target;
    a second mixer that generates a beat signal in accordance with a drive signal and the IF signal; and
    an antenna that alternatingly transmits the frequency modulated signal in a transmission mode and receives the received signal in a reception mode, said antenna alternating between the transmission mode and the reception mode in accordance with the drive signal.

11. The radar apparatus as claimed in claim 10, further comprising:
    an antenna sharing unit, coupled to said antenna, that receives the received signal therefrom;
    a transmission switch that supplies said frequency modulated signal to said antenna sharing unit; and
    a reception switch that supplies the received signal from said antenna sharing unit to said reception mixer in accordance with the drive signal when said transmission switch is open.

12. The radar apparatus as claimed in claim 10, further comprising a single-pole double-throw switch that alternatingly couples said antenna to said oscillator and to said reception mixer.

13. A radar apparatus, comprising:
    an oscillator that generates a frequency modulated signal;
    a reception mixer, coupled to said oscillator, that generates an IF signal by mixing the frequency modulated signal and a received signal formed by the frequency modulated signal reflected from a target, the IF signal indicating a distance to the target and a relative speed of the target;
    an antenna that alternatingly transmits the frequency modulated signal in a transmission mode and receives the received signal in a reception mode, said antenna alternating between the transmission mode and the reception mode in accordance with a drive signal; and
    an interference detection unit, coupled to said reception mixer, that detects in the received signal an interfering signal received from another radar apparatus.

14. The radar apparatus as claimed in claim 13, further comprising a frequency varying unit that varies a center frequency of said frequency modulated signal when the interfering signal is detected.

15. A radar apparatus comprising:
    an oscillator that generates a frequency modulated signal;
    a reception mixer, coupled to said oscillator, that generates an IF signal by mixing the frequency modulated signal and a received signal reflected from a target, the IF signal indicating a distance to the target and a relative speed of the target;
    an interference detection unit, coupled to said reception mixer, that detects in the received signal an interfering signal received from another radar apparatus;
    a first antenna that transmits the frequency modulated signal; and
    a second antenna that receives the received signal.

16. A speed and range detecting method, comprising the steps of:
    alternatingly transmitting a frequency modulated signal and receiving, as a received signal, the frequency modulated signal reflected from a target; and
    mixing the frequency modulated signal and the received signal to generate an IF signal indicating a distance to the target and a relative speed of the target.

* * * * *